United States Patent
Sakamoto et al.

[11] Patent Number: 6,069,678
[45] Date of Patent: May 30, 2000

[54] LIQUID CRYSTAL DISPLAY DEVICE WITH DATA LINE ELECTRIC FIELD SHIELD UTILIZING COMMON ELECTRODE

[75] Inventors: Michiaki Sakamoto; Toshiaki Ishiyama; Yoshihiko Hirai, all of Tokyo, Japan

[73] Assignee: NEC Corporation, Tokyo, Japan

[21] Appl. No.: 08/960,219

[22] Filed: Oct. 29, 1997

[30] Foreign Application Priority Data

Oct. 29, 1996 [JP] Japan .......................................... 286381

[51] Int. Cl.[7] .................................................. G02F 1/1343
[52] U.S. Cl. .......................... 349/141; 349/139; 349/143; 349/144
[58] Field of Search .............................. 349/141, 38, 110, 349/144, 139, 143

[56] References Cited

U.S. PATENT DOCUMENTS

| | | | |
|---|---|---|---|
| 5,327,001 | 7/1994 | Wakai et al. | 349/110 |
| 5,414,547 | 5/1995 | Matsuo et al. | 349/110 |
| 5,734,451 | 3/1998 | Yanagawa et al. | 349/141 |
| 5,763,899 | 6/1998 | Yamazaki et al. | 349/38 |
| 5,790,222 | 8/1998 | Kim | 349/139 |
| 5,818,552 | 10/1998 | Sato et al. | 349/43 |
| 5,835,169 | 11/1998 | Kwon et al. | 349/38 |
| 5,852,485 | 12/1998 | Shimada et al. | 349/141 |
| 5,907,379 | 5/1999 | Kim et al. | 349/141 |

FOREIGN PATENT DOCUMENTS 7-36058  2/1995  Japan .

*Primary Examiner*—William L. Sikes
*Assistant Examiner*—Kari M. Horney
*Attorney, Agent, or Firm*—Sughrue, Mion, Zinn, Macpeak & Seas, PLLC

[57] ABSTRACT

A liquid crystal display device comprises shield means for shielding an electric field generated from a data line. For example, a common electrode is used as the shielding means in an IPS (In-Plane Switching) rode in which an electric field is applied in a direction respecting parallel to the substrates. Specifically, the common electrode is provided closer to the liquid crystal layer than the data line so that the common electrode covers the data line. As a result, the leak electric field from the data line is shielded by the common electrode. Therefore, the leak electric field does not adversely influence a liquid crystal layer. Consequently, the light shield area for the data line is unnecessary. This increases the aperture ratio.

16 Claims, 23 Drawing Sheets

$20° \leq \alpha \leq 85°$

6,069,678

LIQUID CRYSTAL DISPLAY DEVICE WITH DATA LINE ELECTRIC FIELD SHIELD UTILIZING COMMON ELECTRODE

BACKGROUND OF THE INVENTION

This invention relates to a liquid crystal display device, in particular, to a liquid crystal display device having a high aperture ratio.

The conventional liquid crystal display device comprises a scanning line for supplying a scanning signal, a data line for supplying a data signal, a common electrode for supplying a reference potential, a pixel electrode corresponding to a pixel and a thin-film transistor (TFT). A pixel is selected by the scanning signal supplied via the scanning signal line. The data signal supplied via the data line is retained to the selected pixel.

However, a leak electric field is generated between the data line and the pixel electrode in accordance with a voltage supplied to the date line in the conventional liquid crystal display device. This leak electric field gives an adverse influence to a liquid crystal layer.

For example, an aligning condition of liquid crystal molecules close to the data line is disturbed by the leak electric field due to the data line in a normal black mode. As a result, although a black must be naturally displayed, a white or a gray is displayed. That is, so called "cross talk" occurs. Therefore, a light shield area must be sufficiently provided close to the data line. As a result, the aperture ratio is lowered.

SUMMARY OF THE INVENTION

It is therefore object of this invention to provide a liquid crystal display device which is capable of increasing an aperture ratio by reducing a leak electrical field from a data line.

A liquid crystal display device according to this invention comprises means for shielding an electric field generated from a data line. For example, a common electrode is used as the shielding means in an IPS (In-Plane Switching) mode in which an electric field is applied in a horizontal direction respecting a substrate. Specifically, the common electrode is provided closer to the liquid crystal layer than the data line so that the common electrode covers the data line. As a result, the leak electric field from the data line is shielded by the common electrode. Therefore, the leak electric field does not adversely influence the liquid crystal layer. Consequently, the light shield area for the data line is unnecessary. This increases the aperture ratio.

DESCRIPTION OF THE PREFERRED EMBODIMENTS

Referring to FIGS. 1 to 5, a conventional liquid crystal display device will first be described for a better understanding of this invention.

The conventional liquid crystal display device is disclosed in Japanese Unexamined Patent Publication NO. H7-36058 and is substantially equivalent to that disclosed in the publication. The liquid crystal display device is operable in an IPS (In-plane Switching) mode in which an electric field is applied in a horizontal direction for a substrate. Specifically, the liquid crystal display device comprises a scanning signal line 110, a data line 210, a common electrode 310, a pixel electrode 410 and a thin-film transistor (TFT) 510 as shown in FIGS. 1 to 5.

Figure 1:
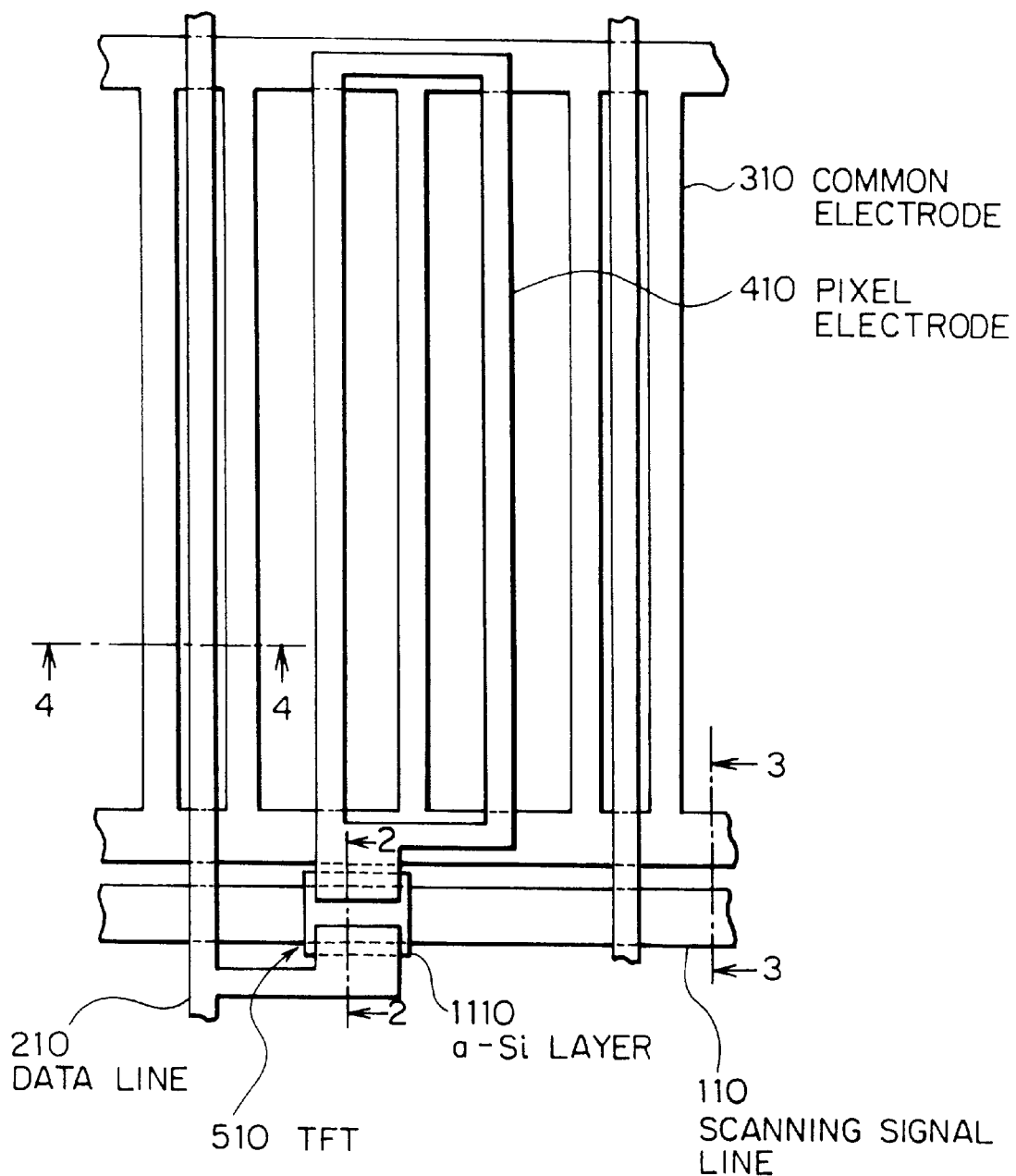
FIG. 1 shows a conventional liquid crystal display device.
Figure 2:
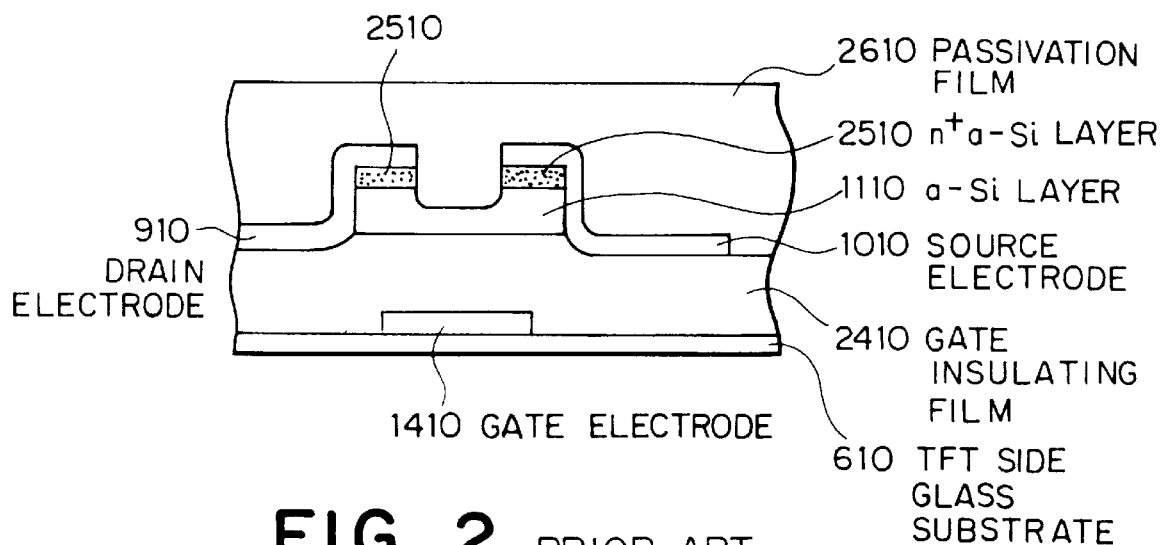
FIG. 2 shows a cross sectional view of a TFT in FIG. 1.
Figure 3:
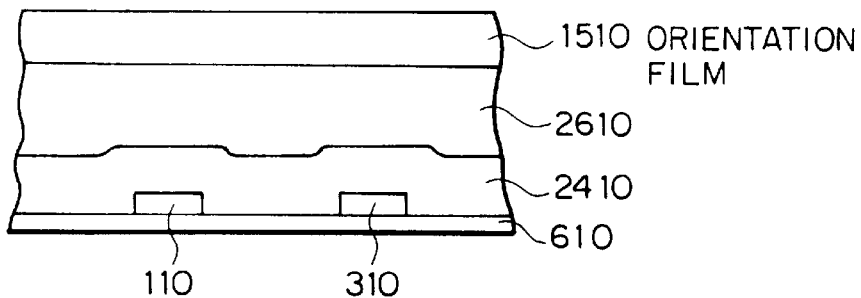
FIG. 3 is a cross sectional view showing a relation between a scanning signal line and a common electrode in FIG. 1.

As best shown in FIG. 2, the TFT 510 comprises a gate electrode 1410 formed on a TFT side glass substrate 610, a gate insulating film 2410 covering the gate electrode 1410, a drain electrode 910, a source electrode 1010 and an amorphous silicon layer (abbreviated to an a-Si layer) formed on the gate insulating film 2410, a-Si layers 2510 of an n$^+$ type interposed between each of the drain and the source electrodes 910 and 1010 and the a-Si layer 1110, and a passivation film 2610. This structure may be of a bottom gate type because the gate electrode 1410 is laid at a lowermost portion and, as a result, the source and drain electrodes are formed over the gate electrode. Therefore, this structure is also generally called a reverse staggered type TFT. In this case, the a-Si layers 2510 of the n$^+$ type are provided to obtain ohmic contacts between the a-Si layer 1110 and the drain electrode 910 and between the a-Si layer 1110 and the source electrode 1010. The scanning signal line 110 is electrically connected to the gate electrode 1410, while the data line 210 is electrically connected to the drain electrode 910. Also, the pixel electrode 410 is electrically connected to the source electrode 1010.

Figure 4:
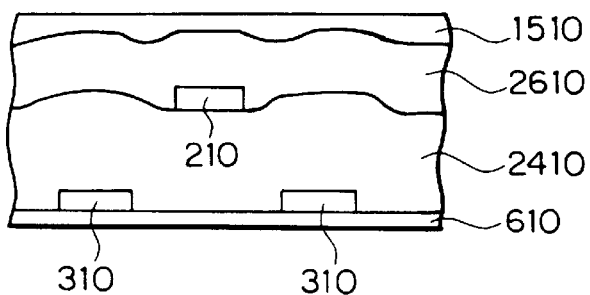
FIG. 4 is a cross sectional view showing a relation between a data line and a common electrode in FIG. 1.

An orientation film 1510 is formed on the passivation film 2610 so as to control liquid crystal molecules, as shown in FIG. 4. Thus, a TFT substrate is constituted of a stack of the TFT side glass substrate 610 to the orientation film 1510.

Furthermore, the liquid crystal device is constituted of the TFT substrate, a liquid crystal layer, and a color filter substrate (CF substrate) having a color layer and a black matrix layer, as known in the art. At any rate, the common electrode 310 and the pixel electrode 410 are located on different layers via the insulating film. In addition, the common electrode 310 and the data line 210 are also arranged on different layers via the insulating film.

Figure 5:
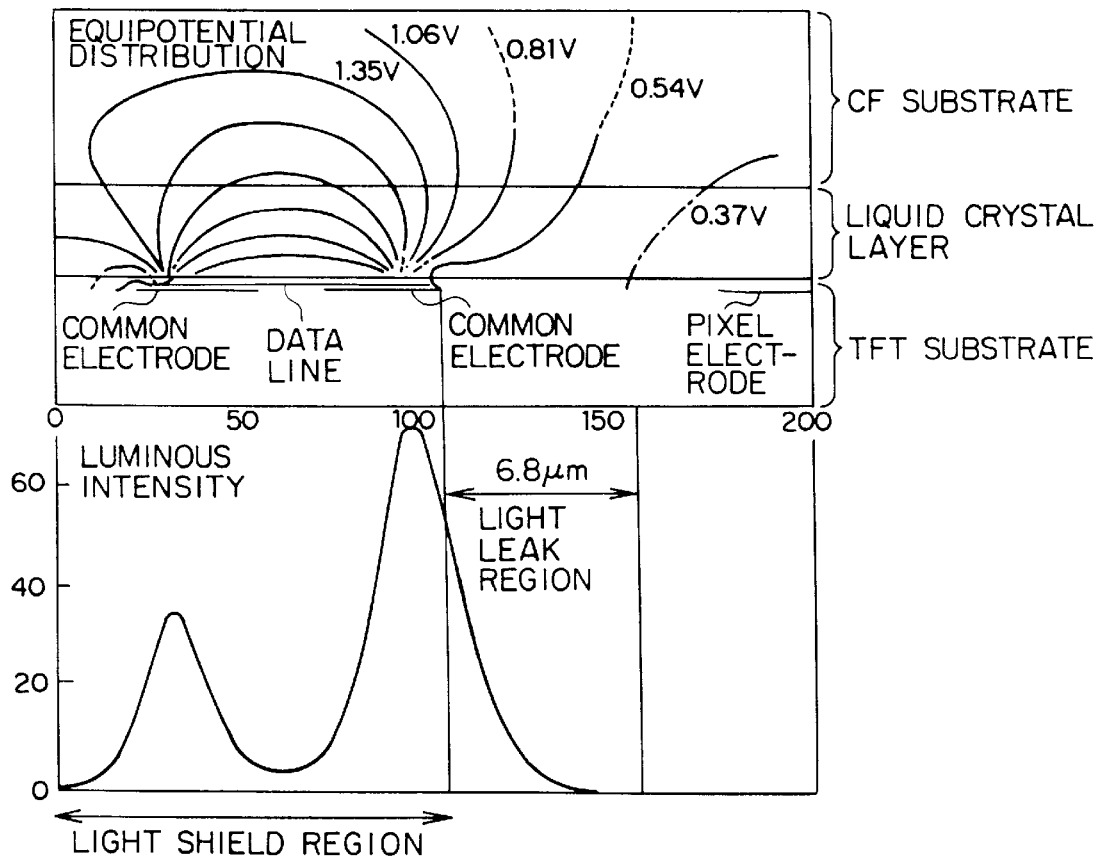
FIG. 5 shows a an equipotential distribution and a luminous intensity of the conventional liquid crystal display device.

With such a structure, a leak electric field is inevitably generated between the data line 210 and the pixel electrode 410 by a voltage supplied to the date line 210 in the conventional liquid crystal display device, as shown in FIG. 5. Such a leak electric field gives an adverse influence for the liquid crystal layer.

Under the circumstances, it is preferable that the leak electric field can be reduced or suppressed which is generated by the data line and which adversely affects the liquid crystal layer. Such a reduction of the leak electric field is helpful to widen an aperture ratio, as will be described.

It is therefore an object of this invention to provide a liquid crystal display device which is capable of increasing an aperture ratio by reducing a leak electrical field from a data line.

(First embodiment)

Referring to FIGS. 6 to 9, a detailed description will be made about a liquid crystal display device according to a first embodiment of this invention.

The illustrated liquid crystal display device comprises a scanning signal line 101 for a scanning signal, a data line 201 for supplying a data signal, a common electrode 301 for a reference potential, a pixel electrode 401 corresponding to a pixel and a thin-film transistor (TFT) 501. A pixel is selected by the scanning signal supplied via the scanning signal line 101. The data signal supplied via the data line 201 is given to the selected pixel.

With this structure, an electric field is generated in a horizontal direction respecting a substrate surface when the data line is supplied with the data signal. Thereby, a display is performed by rotating a molecular direction of the liquid crystal in a horizontal direction on the substrate surface.

Figure 7:
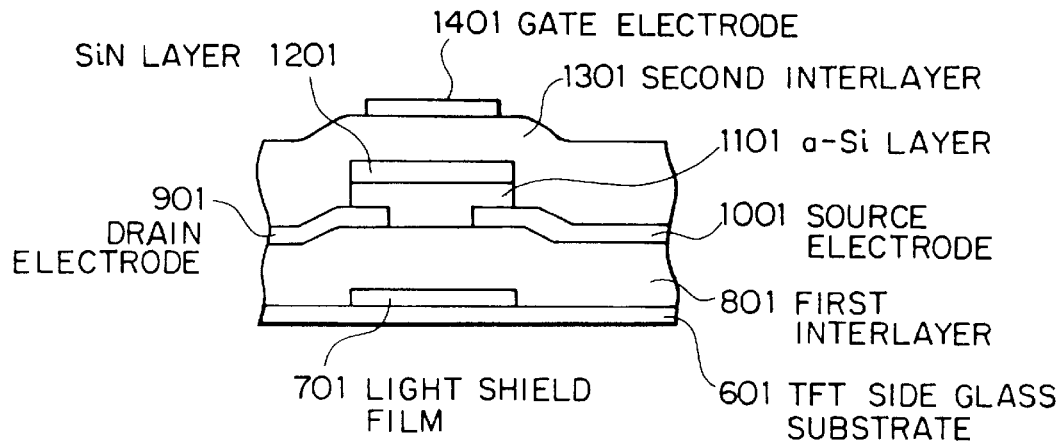
FIG. 7 shows a cross sectional view of a TFT in FIG. 6.

As shown in FIG. 7, the TFT 501 comprises a TFT side glass substrate 601, a light shield film 701, a first interlayer film 801, a drain electrode 901, a source electrode 1001, an a-Si layer 1101, a SiN layer 1201, a second interlayer film 1301 and a gate electrode 1401, all of which are successively stacked. The light shield film 701 is kept in an electrically floating state and shields a light which otherwise enters the a-Si layer 1101. The first interlayer film 801 is an insulating film which is formed on the TFT side glass substrate 601 and which covers the light shield film 701. The drain electrode 901 and the source electrode 1001 are deposited on the first interlayer film 801 and are electrically connected to the data line 201 and the pixel electrode 401, respectively. The a-Si layer 1101 is interposed between the drain electrode 901 and the source electrode 1001 and is partially overlapped thereon. The a-Si layer 1101 serves as a channel region of the TFT 501. The SiN layer 1201 is deposited on the a-Si layer 1101 and serves as an insulating film of the TFT 501.

The second interlayer film 1301 is formed by an insulating film for covering the drain electrode 901, the source electrode 1001, and the SiN layer 1201. The gate electrode 1401 is formed on the second interlayer film and located over the channel region and is electrically connected to the scanning signal line 101. The TFT 501 of this embodiment is generally called a forward staggered type because the gate electrode 1401 is laid at an uppermost portion, as shown in FIG. 7.

Figure 8:
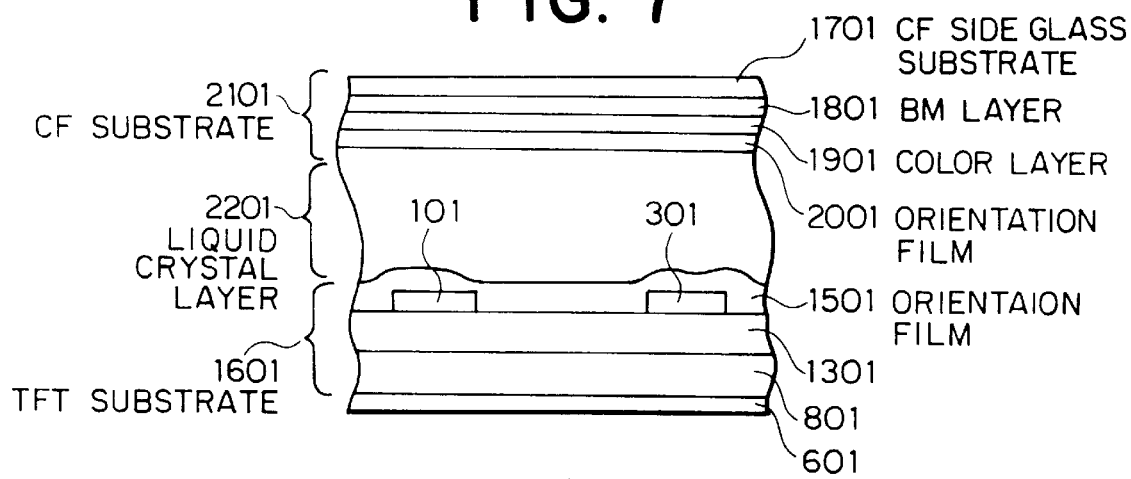
FIG. 8 is a cross sectional view showing a relation between a scanning signal line and a common electrode in FIG. 6.

In FIG. 8, both the scanning signal line 101 and the common electrode 301 are laid on the second inter layer film 1301 on which the gate electrode 1401 is also laid. The data line 201 (FIG. 9) is formed together with the pixel electrode 401 on the first interlayer film 801 on which the drain electrode 901 and the source electrode 1001 (FIG. 7) are also formed.

In addition, the liquid crystal display device comprises an orientation film 1501 which covers the scanning signal line 101, the common electrode 301 and the gate electrode 1401, as shown in FIG. 8. In this case, the entirety from the TFT side glass substrate 601 to the orientation film 1501 is referred to as a TFT substrate or an active device substrate 1601.

On the other hand, the liquid crystal display device comprises a CF glass substrate 1701, a black matrix layer (BM layer) 1801 for shielding unnecessary light, a color layer (color filter, thereinafter CF layer) which is a resin film including dye stuff or pigment having three primary colors of Red, Green, and Blue (RGB), and an orientation film (CF substrate side orientation film) 2001. In this case, the whole of the CF side glass substrate 1701 to the orientation film 2001 is referred to as a CF substrate 2101.

Further, the liquid crystal display device comprises a liquid crystal layer 2201 of in liquid crystal molecular sealed between the TFT substrate 1601 and the CF substrate 2101. Specifically, the liquid crystal layer 2201 is disposed between the orientation 1501 film of the TFT substrate side and the orientation film 2001 of the CF substrate side in such a manner that the liquid crystal layer 2201 is interposed between the TFT substrate 1601 and the CF substrate 2101.

In order to retain the thickness of the liquid crystal layer, spacers (not shown) are practically placed in the liquid crystal display device. However, since these elements do not directly relate to this invention, a detail description thereof is omitted.

Figure 6:
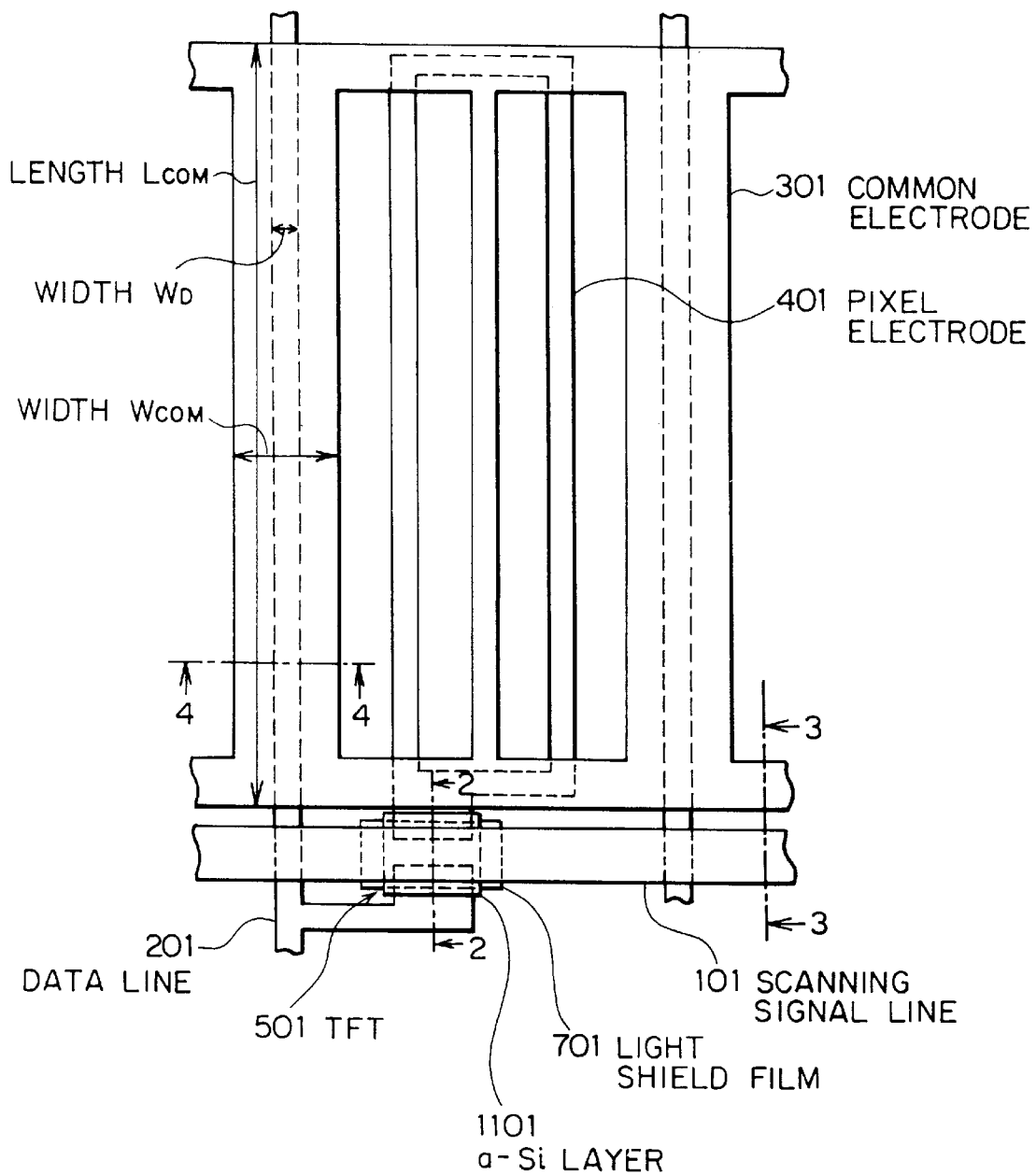
FIG. 6 shows a liquid crystal display device according to a first embodiment of this invention.
Figure 9:
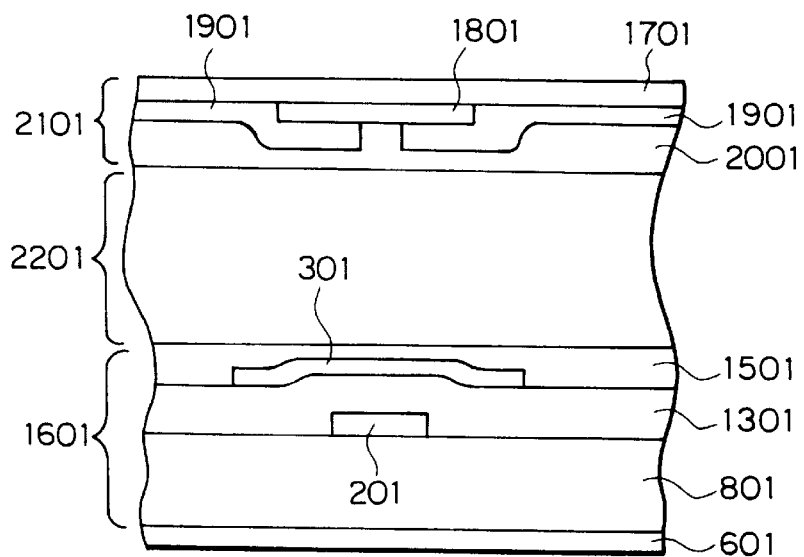
FIG. 9 is a cross sectional view showing a relation between a data line and a common electrode in FIG. 6.

The liquid crystal display device according to this embodiment is featured in that a specific region of the common electrode 301 is formed over a specific region of the data line 201 and covers the entirety of the specific region of the data line 201, as shown in FIGS. 6 and 9. Therefore, an electric field by the data line 201 is substantially and completely shielded by the common electrode 301. As a result, the electric field generated between the pixel electrode 401 and the data line 201 does not influence the liquid crystal layer 2201. Namely, no leak electric field is developed outside of the common electrode 301.

The specific region of the common electrode 301 is shaped into a rectangular configuration over the data line 201 and has the width $W_{COM}$ and the length $L_{COM}$ (FIG. 6). The specific region of the data line 201 is covered with the specific region of the common electrode 301 and has the width $W_D$ and the length $L_{COM}$.

The black matrix (BM) layer 1801 may have a narrow area as compared to the conventional device because any electric field does not leak through the common electrode 301. Consequently, an aperture rate can be increased.

For reference, a description will be made about an example of a method which manufactures the TFT substrate 1601.

First, the light shield film 701 is deposited on the TFT side glass substrate 601 to about 100 Å by sputtering Cr. The shield film 701 is helpful to prevent light incident onto the TFT side glass substrate 601 from entering the overlying a-Si layer 1101.

Next, the first interlayer film 801 is formed to cover the light shield film 701 by depositing SiN (insulator) on the TFT side glass substrate 601 to 3000 Å by the use of the CVD process (FIG. 7).

Subsequently, the drain electrode 901 and the source electrode 1001 are formed to a thickness of about 1000 Å on the first interlayer film 801 by sputtering Cr. The drain electrode 901 is electrically connected to the data line 201, while the source electrode 1001 is electrically connected to the pixel electrode 401.

Next, the a-Si layer 1101 and the SiN layer 1201 are successively left between the drain electrode 901 and the source electrode 1001 and deposited through the CVD process to thickness of about 300 Å and about 500 Å, respectively.

Next, the second interlayer film is placed to cover the drain 901, the source 1001 and the SiN layer 1201 by depositing SiN (insulator) to about 3000 Å through the CVD process. Subsequently, the gate electrode 1401 and the common electrode 301 are formed by sputtering Cr to about 1000 Å. Finally, the orientation film 1501 is formed to cover these elements.

(Second Embodiment)

Referring to FIGS. 10 to 13, a description will be made about a liquid crystal display device according to a second embodiment of this invention.

Although the second embodiment is similar to the first embodiment, it is to be noted that the second embodiment has a common electrode 302 different from that of the first embodiment in shape.

Like in the first embodiment, the liquid crystal display device comprises a scanning line 102, a data line 202, a common electrode 302, a pixel electrode 402 and a TFT 502. A pixel is selected by the scanning signal supplied via the scanning signal line 102. The data signal supplied via the data line 202 is sent to the selected pixel. With such a structure, an electric field is generated in a horizontal direction relative to a substrate surface between the pixel electrode 402 and the common electrode 302. Thereby, a display is by rotating a molecular direction of the liquid crystal in a horizontal direction of the substrate surface.

Figure 11:
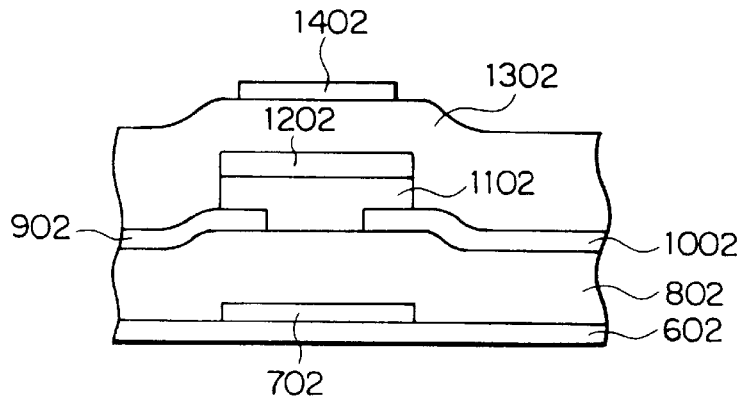
FIG. 11 shows a cross sectional view of a TFT in FIG. 10.

As shown in FIG. 11, the TFT 502 comprises a TFT side glass substrate 602, a light shield film 702, a first interlayer film 802, a drain electrode 902, a source electrode 1002, an a-Si layer 1102, a SiN layer 1202, a second interlayer film 1302, and a gate electrode 1402 like the first embodiment. The illustrated TFT 502 also forms the forward staggered type TFT like the first embodiment.

Figure 12:
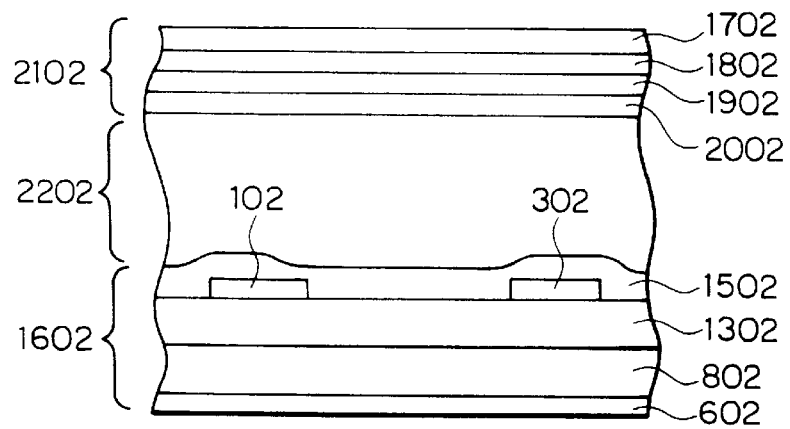
FIG. 12 is a cross sectional view showing a relation between a scanning signal line and a common electrode in FIG. 10.

As shown in FIG. 12, the scanning signal line 102 and the common electrode 302 are deposited on the second interlayer film 1302 on which the gate electrode 1402 is formed, as shown in FIG. 11, like the first embodiment. The data line 202 and the pixel electrode 402 are formed on the first interlayer film 802 together with the drain electrode 902 and the source electrode 1002.

In addition, the liquid crystal display device comprises an orientation film 1502 covering the scanning signal line 102, the common electrode 302 and the gate electrode 1402, as shown in FIG. 12. In this case, the entirety of the TFT side glass substrate 602 to the orientation film 1502 is referred to as a TFT substrate 1602 like the first embodiment.

Furthermore, a CF glass substrate 1702, a black matrix layer (BM layer) 1802, CF layer 1902 and an orientation film (CF substrate side orientation film) 2002 are opposite to the TFT substrate 1602 with a spacing left therebetween in the illustrated liquid crystal display device. In this case, the combination of the CF side glass substrate 1702 to the orientation film 2002 is referred to a CF substrate 2102 like the first embodiment.

In addition, a liquid crystal layer 2202 is disposed in the spacing between the orientation 1502 film of the TFT substrate side and the orientation film 2002 of the CF substrate side. In other words, the liquid crystal layer 2202 is interposed between the TFT substrate 1602 and the CF substrate 2102 like the first embodiment.

Figure 10:
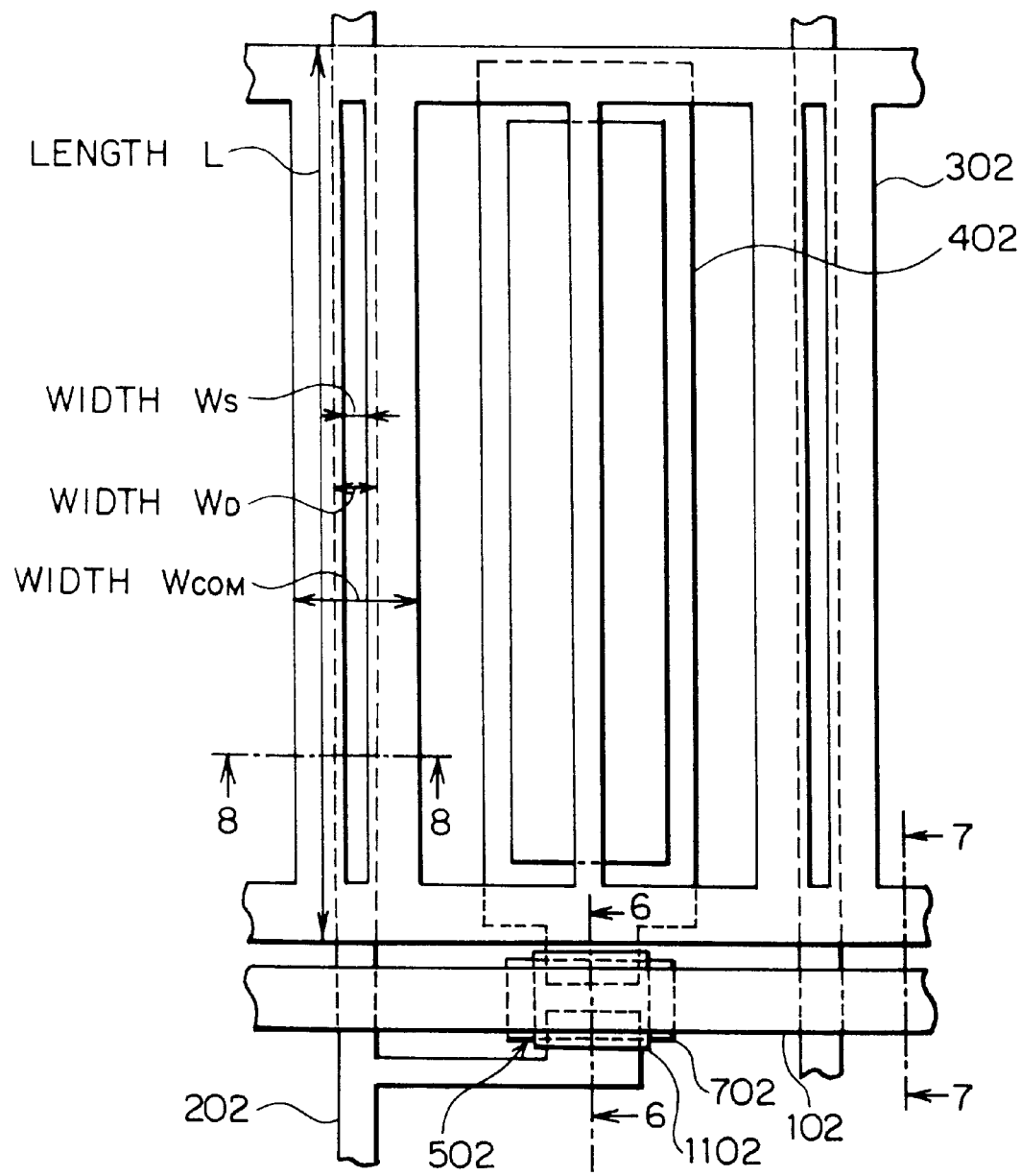
FIG. 10 shows a liquid crystal display device according to a second embodiment of this invention.
Figure 13:
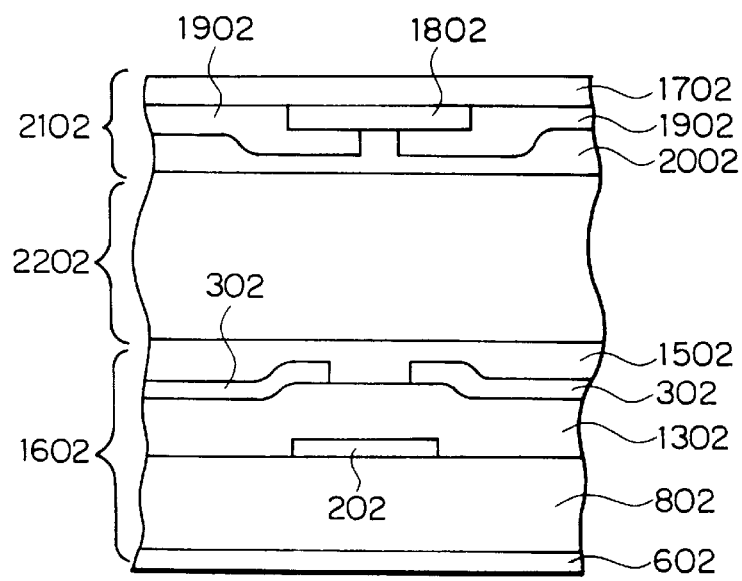
FIG. 13 is a cross sectional view showing a relation between a data line and a common electrode in FIG. 10.

In this embodiment, a specific region of the common electrode 302 is formed over a specific region of the data line 202 to cover the entire specific region of the data line 202, as shown in FIGS. 10 and 13 in a manner somewhat different from the the first embodiment. Specifically, the specific region of the common electrode 302 in the second embodiment has a slit having a narrower width Ws than the width $W_D$ of the specific region of the data line 202, as shown in FIGS. 10 and 13. In this case, the width $W_{COM}$ is wider than the width $W_D$ of the specific region of the data line 202. Also, each specific region of the common electrode 302 and the data line 202 has the length L.

In this embodiment, an electric field from the data line 202 is shielded by the common electrode 302. As a result, the influence of the liquid crystal layer 2202 due to the electric field can be reduced. Namely the leak electric field can be reduced. Although the leak electric field can not be completely eliminated due to the slit in this embodiment as compared to the first embodiment, such a slit serves to reduce a parasitic capacitance between the data line 202 and the common electrode 302 because the common electrode 302 is narrow in area.

(Third Embodiment)

Referring to FIGS. 14 to 18, a description will be made about a liquid crystal display device according to a third embodiment of this invention.

The third embodiment is similar to the first embodiment except that the third embodiment has an arrangement of electrodes different from the first embodiment.

The liquid crystal display device comprises a scanning line 103, a data line 203, a common electrode 303, a pixel electrode 403 and a TFT 503. A pixel is selected by the scanning signal supplied via the scanning signal line 103. The data signal supplied via the data line 203 is sent to the selected pixel. With such a structure, an electric field is generated in a horizontal direction relative to a substrate surface between the pixel electrode 403 and the common electrode 303. Thereby, a display is performed by rotating a molecular direction of the liquid crystal in a horizontal direction of the substrate surface.

Figure 15:
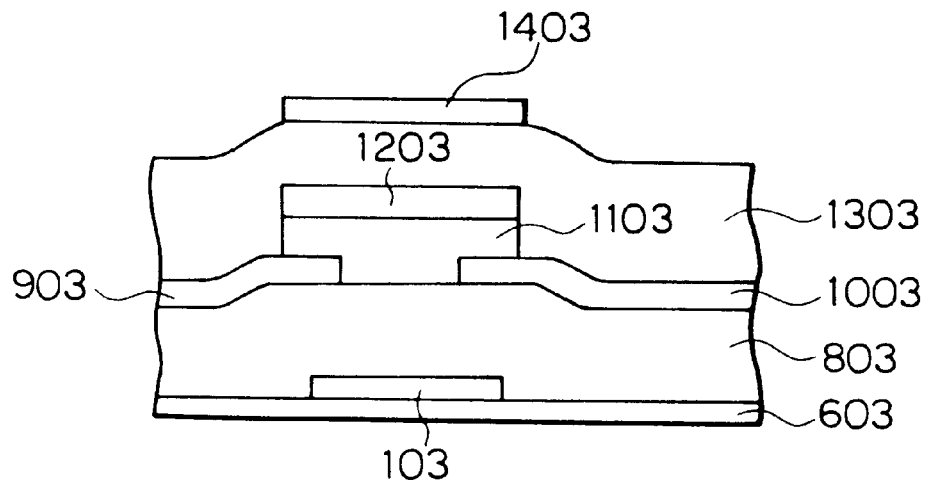
FIG. 15 shows a cross sectional view of a TFT in FIG. 14.

As shown in FIG. 15, the TFT 503 comprises a TFT side glass substrate 603, a scanning signal line 103, a first interlayer film 803, a drain electrode 903, a source electrode 1003, an a-Si layer 1103, a SiN layer 1203, a second interlayer film 1303 and a gate electrode 1403. The TFT 503 also forms the forward staggered type TFT like the first embodiment.

In this case, the scanning signal line 103 functions as the light shield film 701 shown in FIG. 7. In addition, the gate electrode 1403 and the scanning signal line 103 are formed on different layers. The gate electrode 1403 is electrically connected to the scanning signal line 103 via a contact 2303 as shown in FIG. 16.

Figure 16:
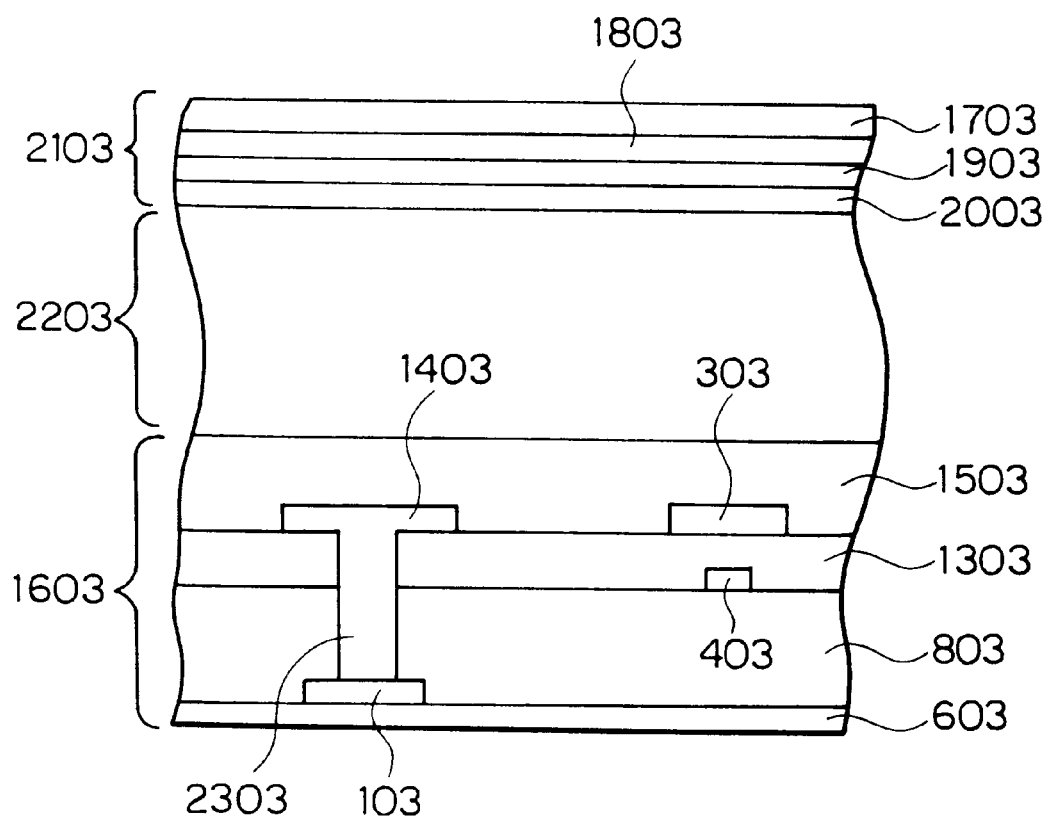
FIG. 16 is a cross sectional view showing a relation between a scanning signal line and a gate electrode in FIG. 14.
Figure 17:
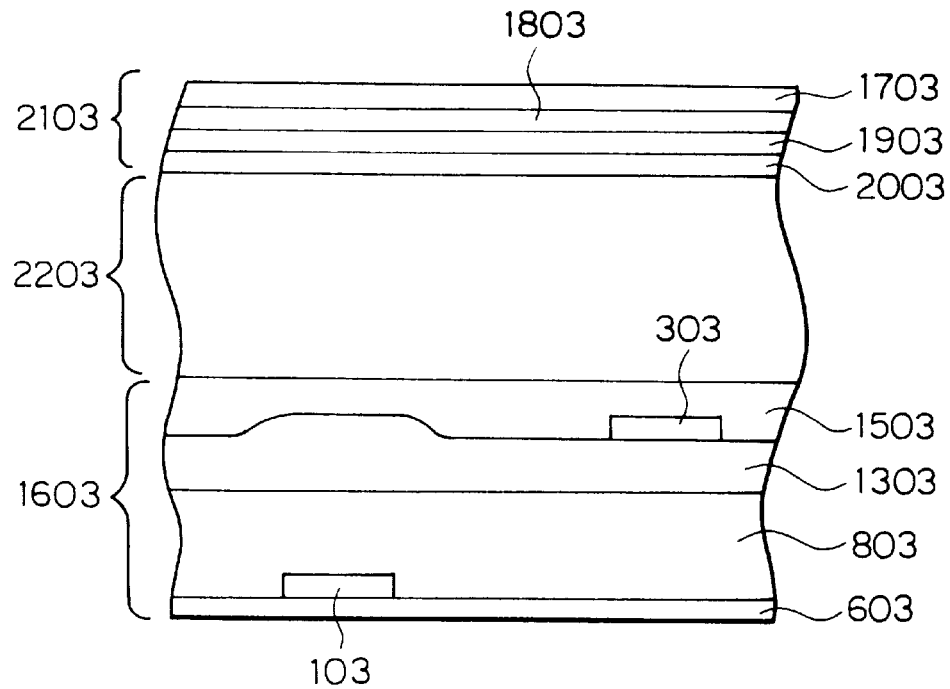
FIG. 17 is a cross sectional view showing a relation between a scanning signal line and a common electrode in FIG. 14.

Further, the scanning signal line 103 and the common electrode 303 are on different layers, as shown in FIG. 17. That is, the scanning signal line 103 is formed on the TFT side glass substrate 603, while the common electrode 303 is formed on the second interlayer film 1303 along with the gate electrode 1403. Also, the data line 203 and the pixel electrode 403 are formed on the first interlayer film 803 together with the drain electrode 903 and the source electrode 1003 as shown FIGS. 16 and 18.

In addition, an orientation film 1503 covers the common electrode 303 and the gate electrode 1403, shown in FIG. 16, like in the previous embodiment. In this case, the entirety of the TFT side glass substrate 603 to the orientation film 1503 provides a TFT substrate 1602 like the first embodiment.

On the other hand, the liquid crystal display device comprises a CF glass substrate 1703, a BM layer 1803, a CF layer 1903 and an orientation film (CF substrate side orientation film) 2003, all of which may be collectively called a CF substrate 2103 like the first embodiment.

Further, the liquid crystal display device comprises a liquid crystal layer 2203 interposed between the orientation 1503 film of the TFT substrate side and the orientation film 2003 of the CF substrate side, like in the first embodiment.

Figure 14:
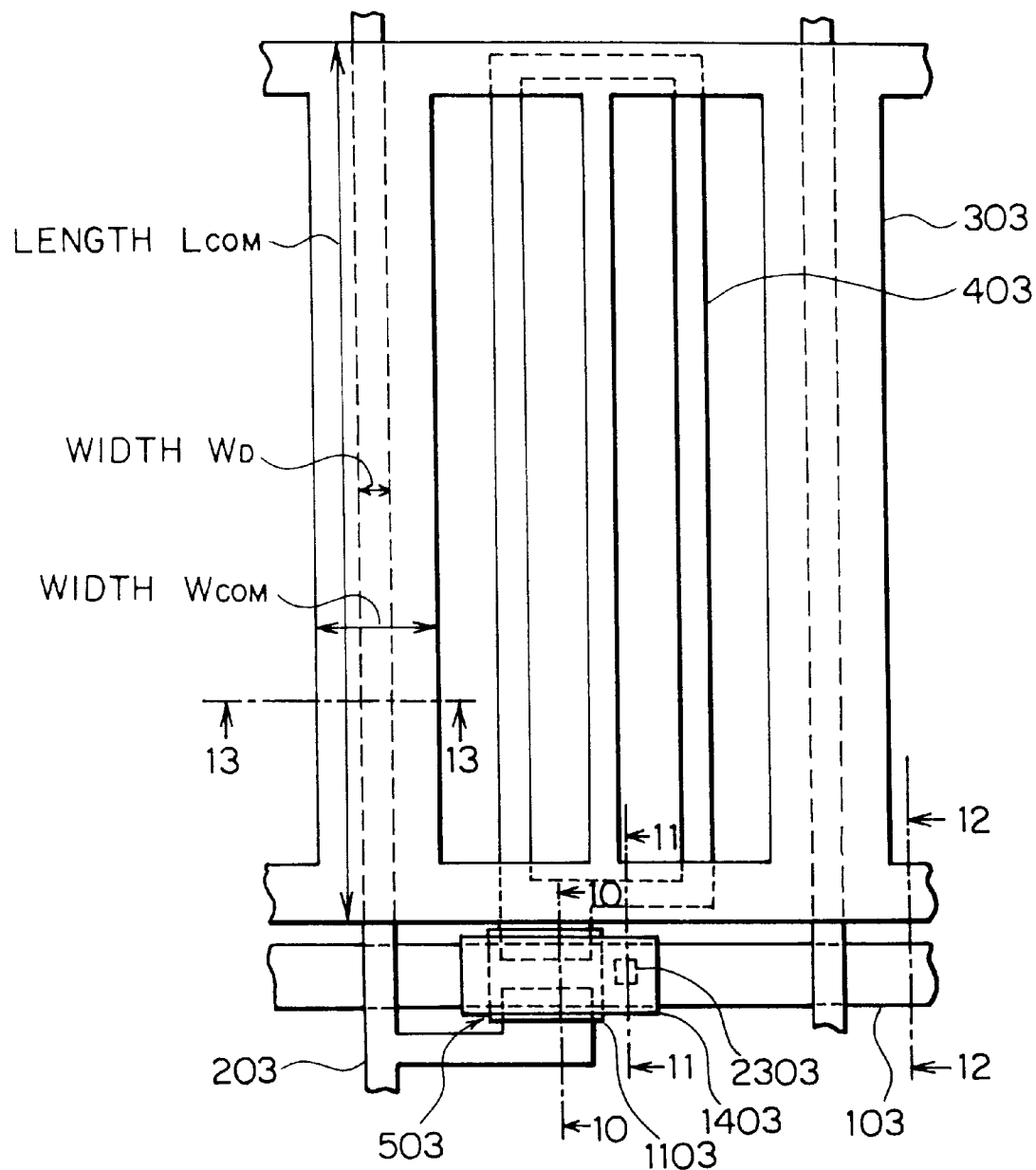
FIG. 14 shows a liquid crystal display device according to a third embodiment of this invention.
Figure 18:
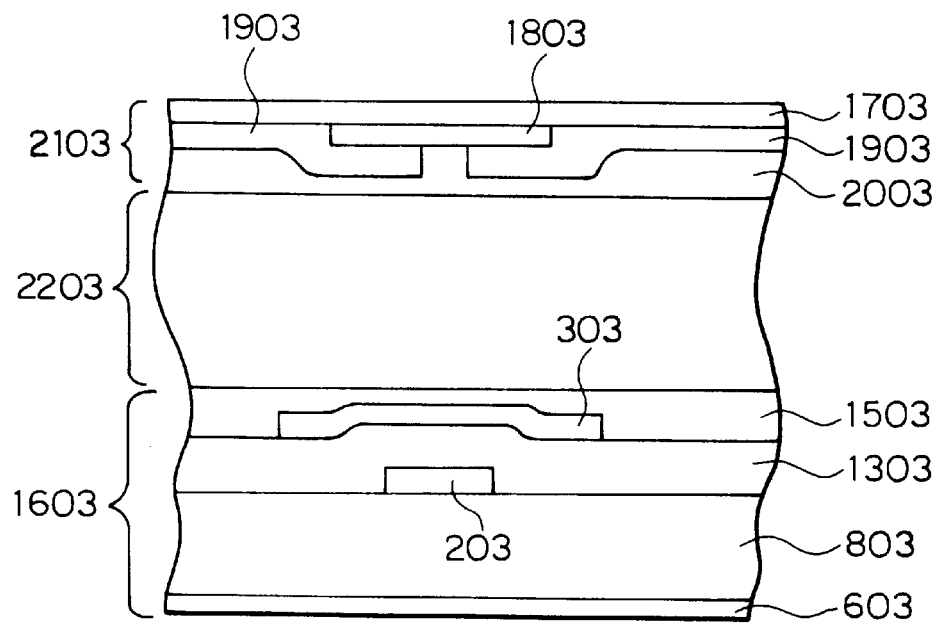
FIG. 18 is a cross sectional view showing a relation between a data line and a common electrode in FIG. 14.
Figure 19:
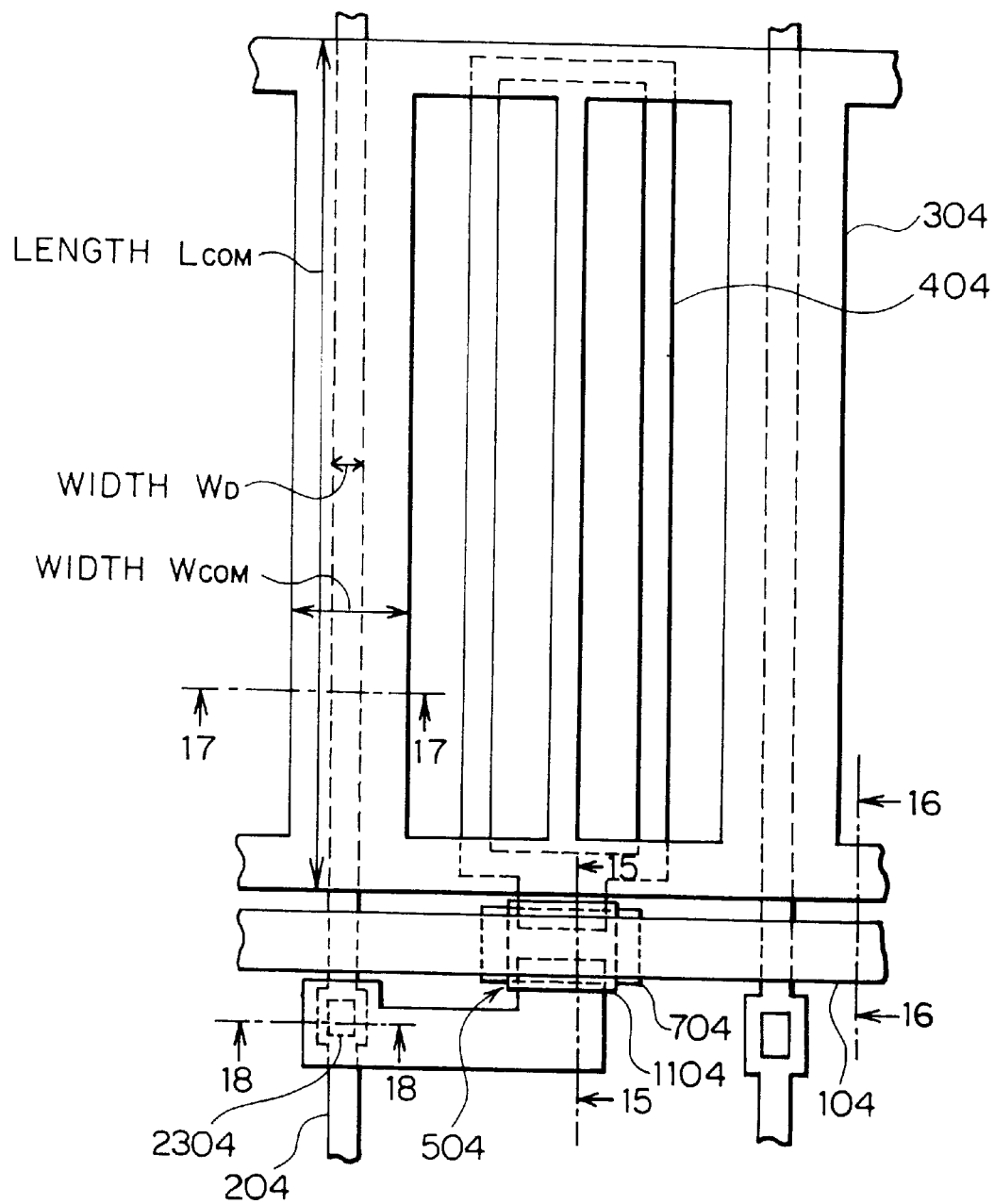
FIG. 19 shows a liquid crystal display device according to a fourth embodiment of this invention.

In this embodiment, a specific region of the common electrode 303 is formed over a specific region of the data line 203 to entirely cover the specific region of the data line 203, as shown in FIGS. 14 and 18, like in the first embodiment. The specific region of the common electrode 303 has a rectangular shape having the width $W_{COM}$ and the length $L_{COM}$, while the specific region of the data line 203 has a narrow rectangular shape having the width $W_D$ and the length $L_{COM}$, like in the first embodiment.

Therefore, in this embodiment, any electric field does not leak through the common electrode 303 when the data line 203 is driven. In addition, the common electrode 303 can not be electrically shorted to the scanning signal line 103 during manufacturing the device, since the common electrode 303 overlies and is offset from the scanning signal line 103. Consequently, the manufacturing yield is enhanced.

For reference, description will be made in detail about the TFT substrate 1603 related to the third embodiment of this invention.

First, the scanning signal line 103 is deposited on a TFT side glass substrate 603 to about 1000 Å by sputtering Cr.

Next, a first interlayer film 803 is formed to cover the scanning signal line 103 by depositing SiN (insulator) for a TFT side glass substrate 603 to about 3000 Å through the CVD process.

Subsequently, the drain electrode 903, the data line 202, the source electrode 1003 and the pixel electrode 402 are deposited to about 1000 Å on the first interlayer film 803 by sputtering Cr. The drain electrode 903 is electrically connected to the data line 203 while the source electrode 1003 is electrically connected to a pixel electrode 403.

Next, the a-Si layer 1103 and the SiN layer 1203 are left between the drain electrode 903 and the source electrode 1003 by depositing through the CVD process to about 300 Å and about 500 Å, respectively.

Next, the second interlayer film 1303 is formed on the drain 903, the data line 203, the source 1003, the pixel electrode 403, and the SiN layer 1203 which is deposited to about 3000 Å through the CVD process. Subsequently, the first interlayer film 803 and the second interlayer film 1303 are etched to form a hole reaching to the scanning signal line 103, and the hole is filled with Cr to form the contact 2303.

Next, the gate electrode 1403 and the common electrode 303 are deposited to a thickness of about 1000 Å by sputtering Cr. In this case, the gate electrode 1403 is electrically connected to the scanning signal line 103 via the contact 2303. Finally, the orientation film 1503 is formed to cover these elements.

(Fourth Embodiment)

Referring to FIGS. 19 to 23, a description will be made about a liquid crystal display device according to a fourth embodiment of this invention.

The liquid crystal display device according to the fourth embodiment is similar to the first embodiment except that the fourth embodiment has is an arrangement of a common electrode and a data line different from the first embodiment.

More specifically, the liquid crystal display device comprises a scanning line 104, a data line 204, a common electrode 304, a pixel electrode 404 and a TFT 504. A pixel is selected by the scanning signal supplied via the scanning signal line 104 while the data signal supplied via the data line 204 is retained to the selected pixel. With such a structure, an electric field is generated between the pixel electrode 404 and the common electrode 304 in a horizontal direction for a substrate surface. Thereby, a display is made by rotating a molecular direction of the liquid crystal in the horizontal direction to the substrate surface.

Figure 20:
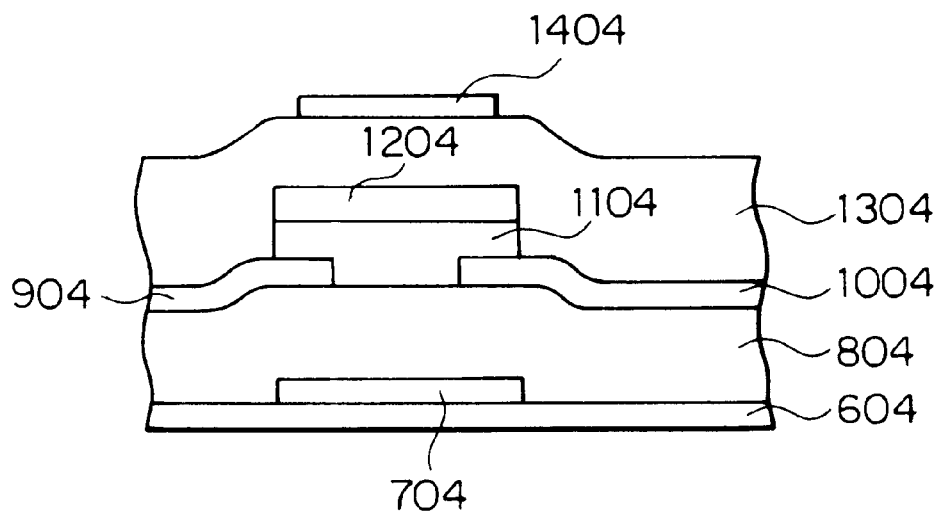
FIG. 20 shows a cross sectional view of a TFT in FIG. 19.

As shown in FIG. 20, the TFT 504 comprises a TFT side glass substrate 604, a light shield film 704, a first interlayer film 804, a drain electrode 904, a source electrode 1004, an a-Si layer 1104, a SiN layer 1204, a second interlayer film 1304 and a gate electrode 1404. The TFT 504 also forms the forward staggered type like in the first embodiment.

Figure 21:
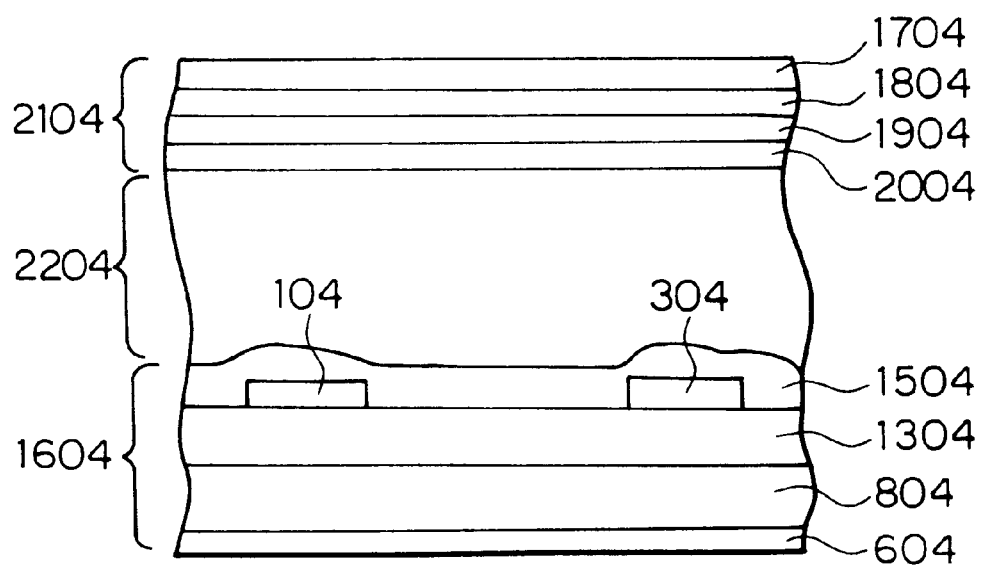
FIG. 21 is a cross sectional view showing a relation between a scanning signal line and a common electrode in FIG. 19.
Figure 23:
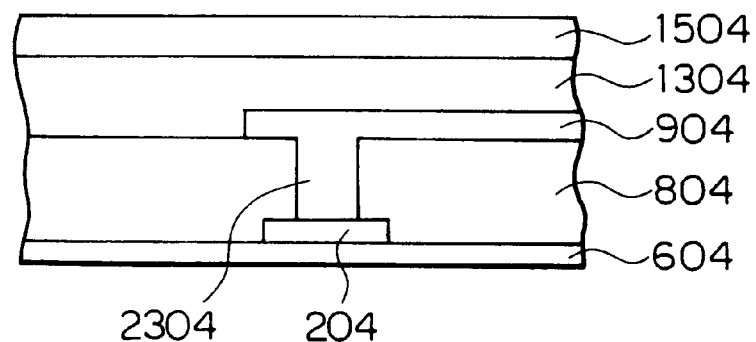
FIG. 23 is a cross sectional view showing a relation between a data line and a drain electrode in FIG. 19.

As shown in FIG. 21, the scanning signal line 104 and the common electrode 304 are located on the second inter layer film 1304 together with the gate electrode 1404. On the other hand, the data line 204 and the pixel electrode 404 are placed on different layers. That is, the data line 204 is formed on the TFT side glass substrate 604, while the pixel electrode 404 is formed on the first interlayer film 804. In this case, the drain electrode 904 is electrically connected to the data line 204 via a contact 2304, as shown in FIG. 23.

In addition, the liquid crystal display device comprises an orientation film 1504 covering the scanning signal line 104, the common electrode 304 and the gate electrode 1404 shown in FIGS. 21 through 123. In this case, the entirety of the TFT side glass substrate 604 to the orientation film 1504 is referred to as a TFT substrate 1604.

On the other hand, the liquid crystal display device comprises a CF glass substrate 1704, a BM layer 1804, a CF layer 1904, and an orientation film (CF substrate side orientation film) 2004. In this case, the whole of the CF side glass substrate 1704 to the orientation film 2004 is referred to as a CF substrate 2104.

Further, the liquid crystal display device comprises a liquid crystal layer 2204. The liquid crystal layer 2204 is disposed between the orientation film 1504 of the TFT substrate side and the orientation film 2004 of the CF substrate side in such a manner that the liquid crystal layer 2204 is interposed between the TFT substrate 1604 and the CF substrate 2104 like the first embodiment.

Figure 22:
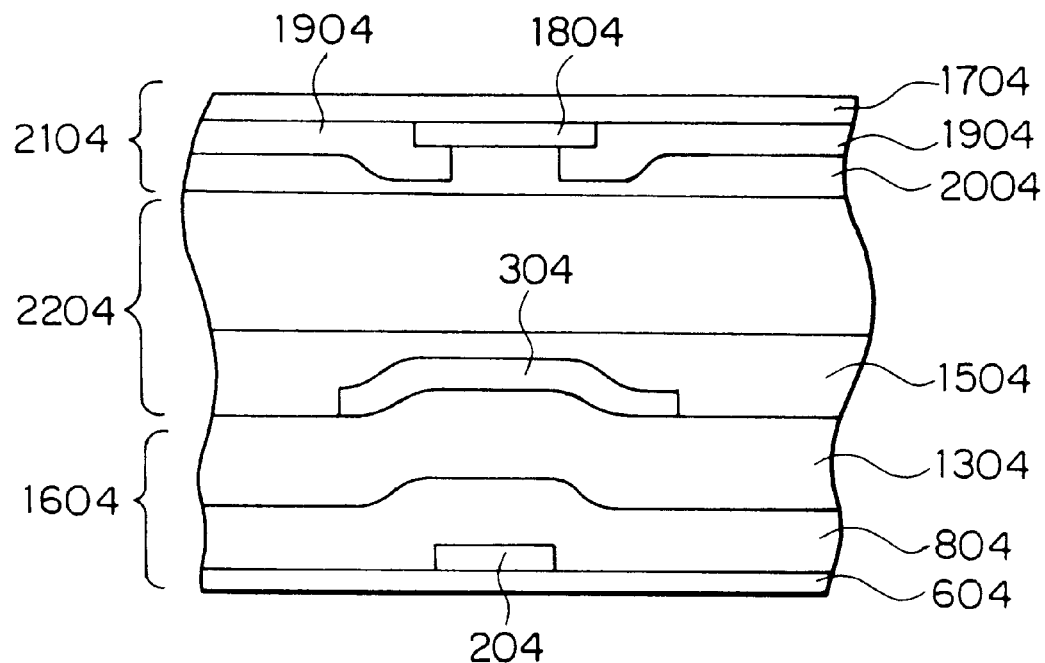
FIG. 22 is a cross sectional view showing a relation between a data line and a common electrode in FIG. 19.
Figure 24:
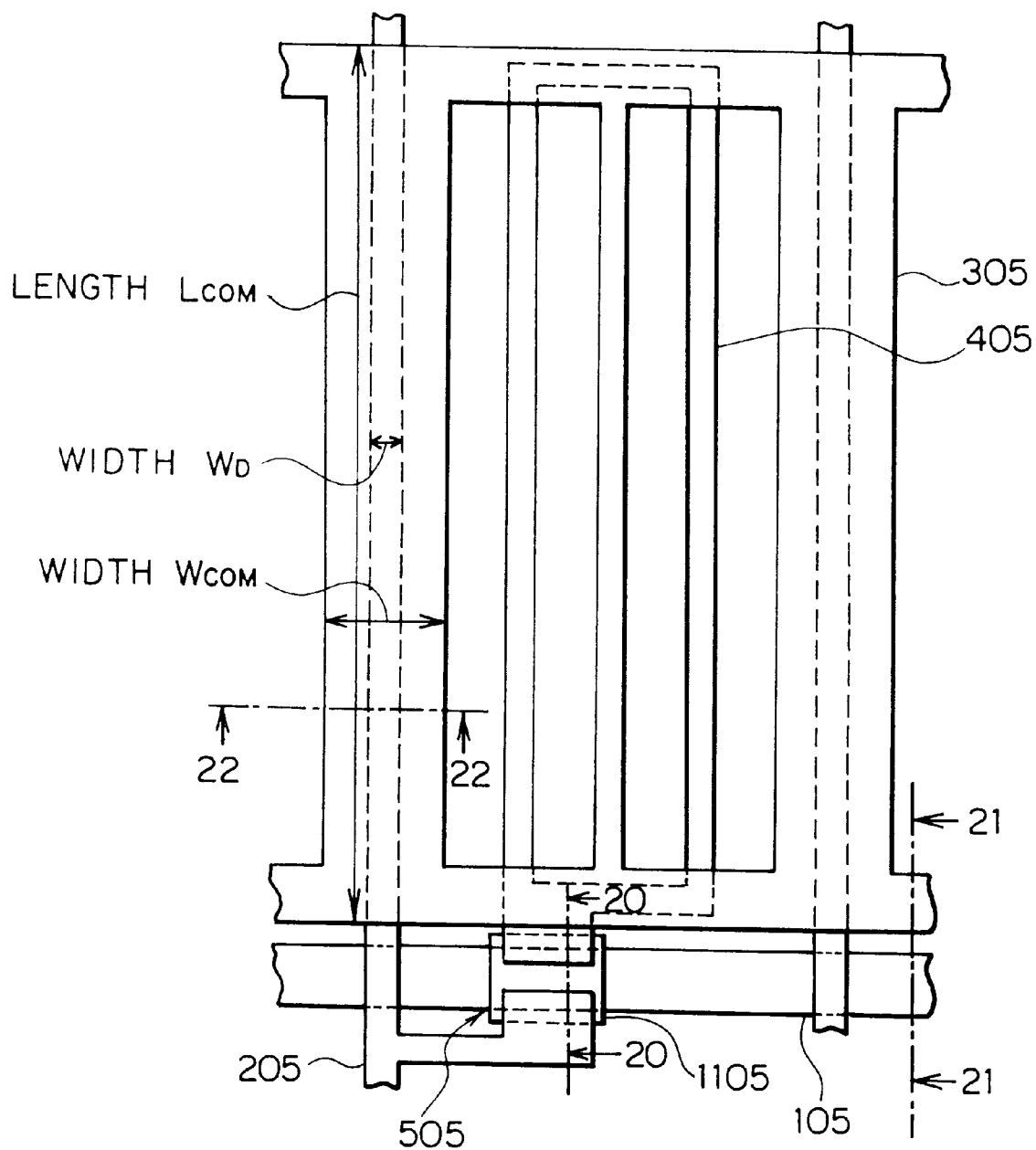
FIG. 24 shows a liquid crystal display device according to a fifth embodiment of this invention.

In this embodiment, a specific region of the common electrode 304 is formed over a specific region of the data line 204 to cover the whole of the specific region of the data line 204 as shown in FIGS. 22 and 24. The specific region of the common electrode 304 has a rectangular shape having the width $W_{COM}$ and the length $L_{COM}$, while the specific region of the date line 204 has a rectangular shape having the width $W_D$ and the length $L_{COM}$.

Therefore, in this embodiment, the leak electric field can substantially be eliminated like in the first embodiment. In addition, a parasitic capacitance between the data line 204 and the common electrode 304 can be reduced as compared to the first embodiment, since the distance between the data line 204 and the common electrode 304 becomes large.

For reference, a description will be made about the TFT substrate 1604 related to the fourth embodiment of this invention.

First, the data line 204 and the light shield film 704 are formed to about 1000 Å on a TFT side glass substrate 604 by sputtering Cr.

Next, the first interlayer film 804 is formed to cover the data line 204 and the light shield film 704 by depositing SiN (insulator) to about 3000 Å on a TFT side glass substrate 604 through the CVD process.

Subsequently, the first interlayer film 804 is etched to form a hole reaching to the data line 204, and the hole is filled with a conductor to form the contact 2304.

Next, the drain electrode 904, the source electrode 1004 and the pixel electrode 404 are formed to about 1000 Å on the first interlayer film 804 by sputtering ITO (Indium Tin oxide). The drain electrode 904 is electrically connected to the data line 204 via the contact 2304, while the source electrode 1003 is electrically connected to a pixel electrode 404.

Next, the a-Si layer 1104 and the SiN layer 1204 are formed between the drain electrode 904 and the source electrode 1004 by depositing through CVD to about 300 Å and about 500 Å, respectively.

Next, the second interlayer film 1304 is formed on the drain 904, the source electrode 1004, the pixel electrode 404 and the SiN layer 1204 by depositing SiN (insulator) to about 3000 Å through the CVD process.

Next, the scanning signal line 104, the common electrode 304 and the gate electrode 1404 are formed by sputtering Cr to about 1000 Å. In this case, the gate electrode 1404 is electrically connected to the scanning signal line 104. Finally, the orientation film 1504 is formed to cover these elements.

(Fifth Embodiment)

Referring to FIGS. 24 to 27, a description will be made about a liquid crystal display device according to a fifth embodiment of this invention.

The liquid crystal display device according to the fifth embodiment is similar to the first embodiment except that the fifth embodiment has an arrangement of electrodes and a type of a TFT different from the first embodiment.

Specifically, the liquid crystal display device comprises a scanning line 105, a data line 205, a common electrode 305, a pixel electrode 405 and a TFT 505. A pixel is selected by the scanning signal supplied via the scanning signal line 105. The data signal supplied via the data line 205 is sent to the selected pixel. With such a structure, an electric field is generated in a horizontal direction of a substrate surface between the pixel electrode 405 and the common electrode 305. Thereby, a display is performed by rotating a molecular direction of the liquid crystal in a horizontal direction respecting the substrate surface.

Figure 25:
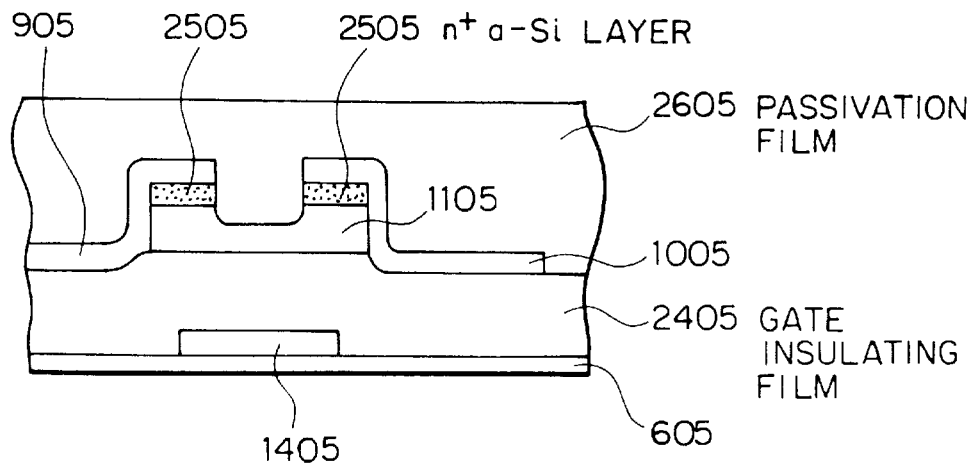
FIG. 25 shows a cross sectional view of a TFT in FIG. 24.

As shown in FIG. 25, the TFT 505 comprises a TFT side glass substrate 605, a gate electrode 1405, a gate insulating film 2405, a drain electrode 905, a source electrode 1005, an a-Si layer 1105, n$^+$a-Si layer 2505, passivation film 2605. The TFT 505 forms the reverse staggered type TFT having a bottom gate structure different from the first embodiment. The n$^+$a-Si layer 2505 is provided to obtain an ohmic contact between the a-Si layer 1105 and the drain electrode 905 and between the a-Si layer 1105 and the source electrode 1005.

Figure 26:
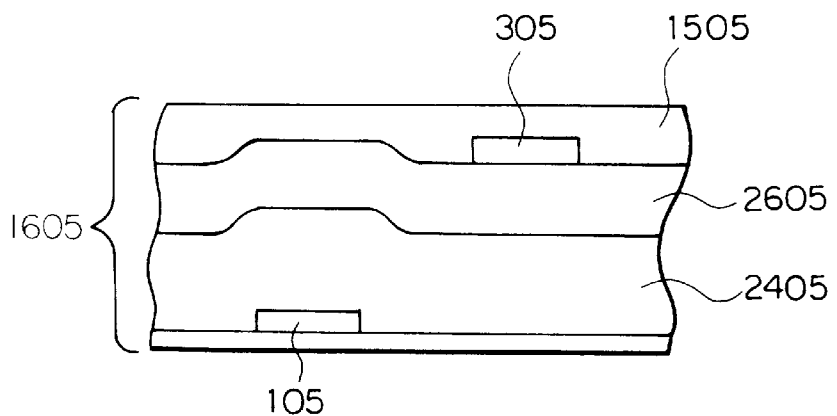
FIG. 26 is a cross sectional view showing a relation between a scanning signal line and a common electrode in FIG. 24.
Figure 27:
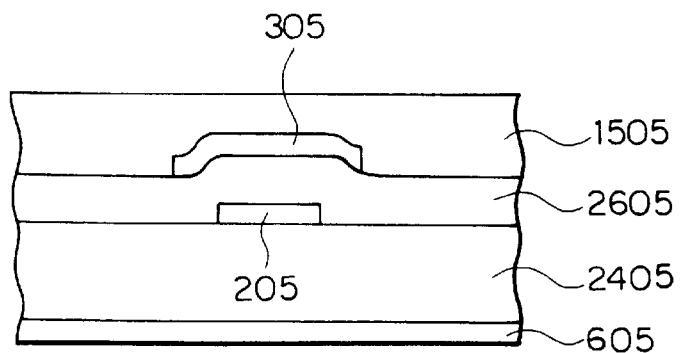
FIG. 27 is a cross sectional view showing a relation between a data line and a common electrode in FIG. 24.
Figure 28:
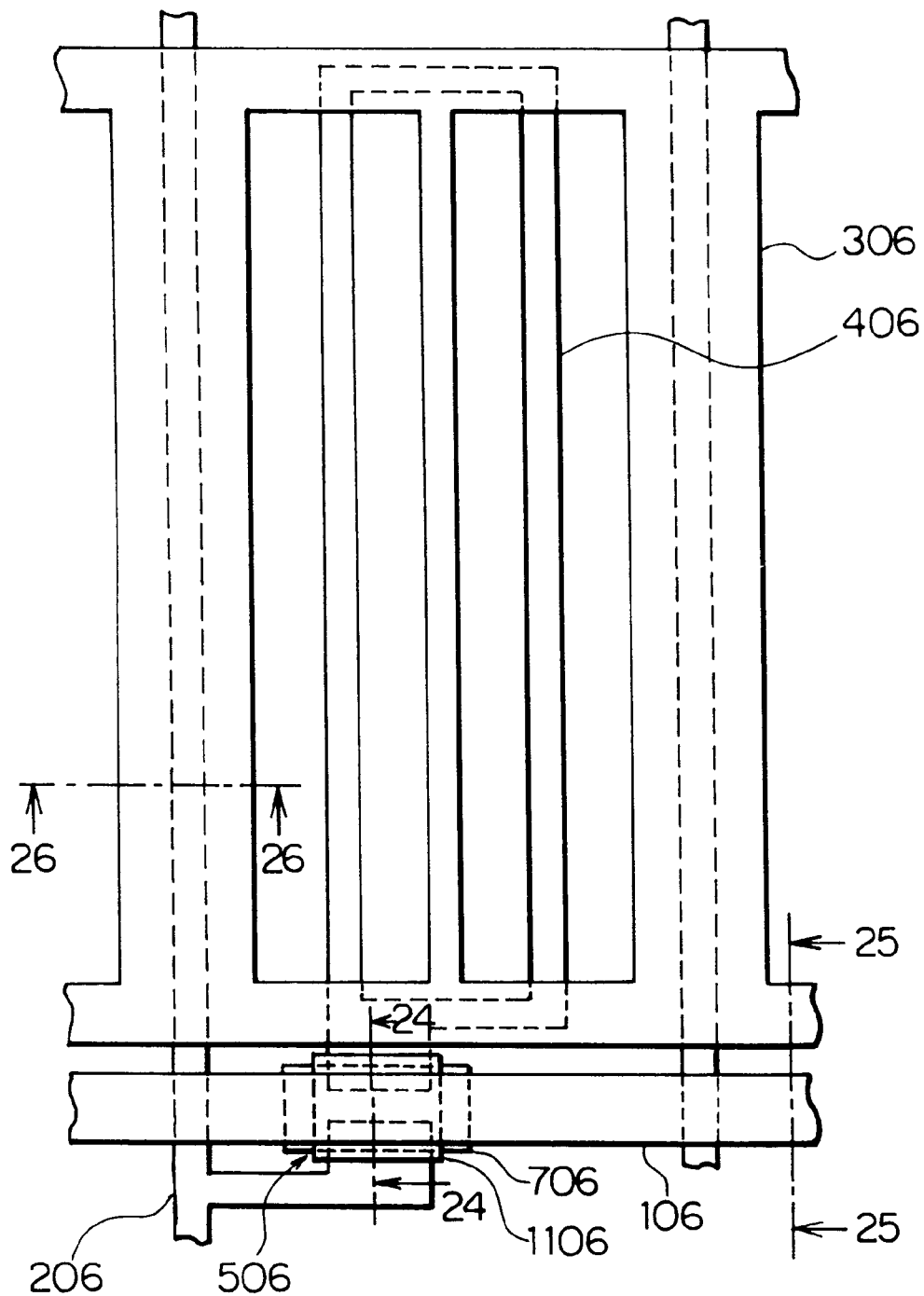
FIG. 28 shows a liquid crystal display device according to a sixth embodiment of this invention.
Figure 29:
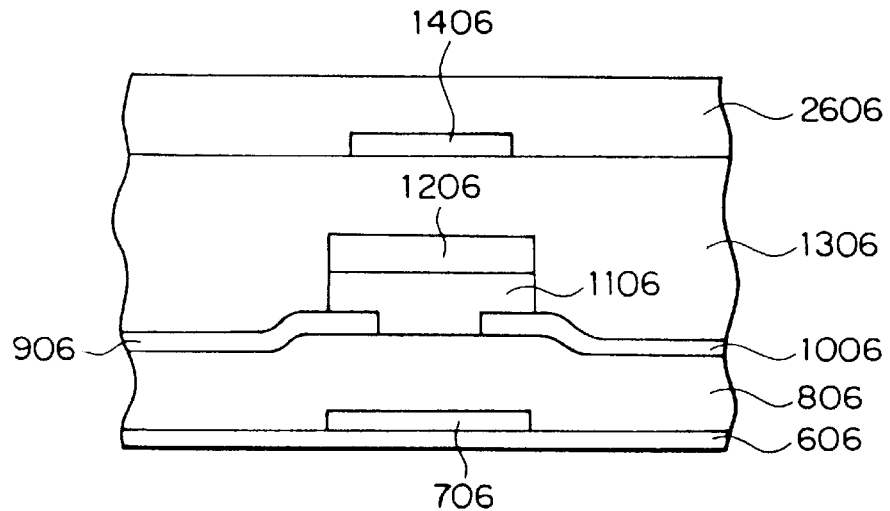
FIG. 29 shows a cross sectional view of a TFT in FIG. 28.
Figure 30:
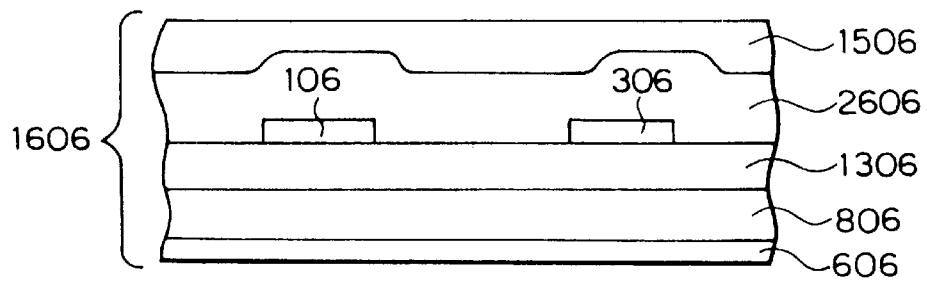
FIG. 30 is a cross sectional view showing a relation between a scanning signal line and a common electrode in FIG. 28.
Figure 31:
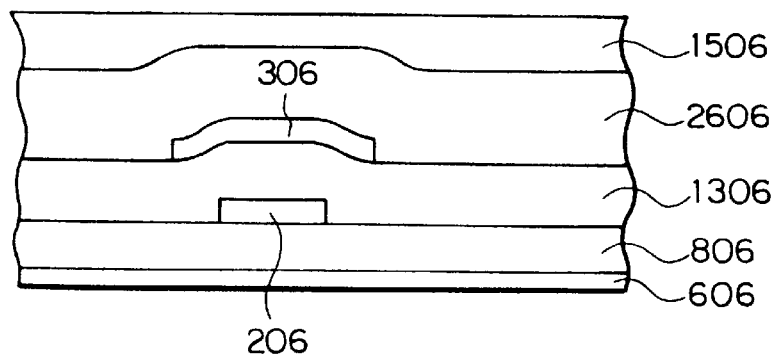
FIG. 31 is a cross sectional view showing a relation between a data line and a common electrode in FIG. 28.
Figure 32:
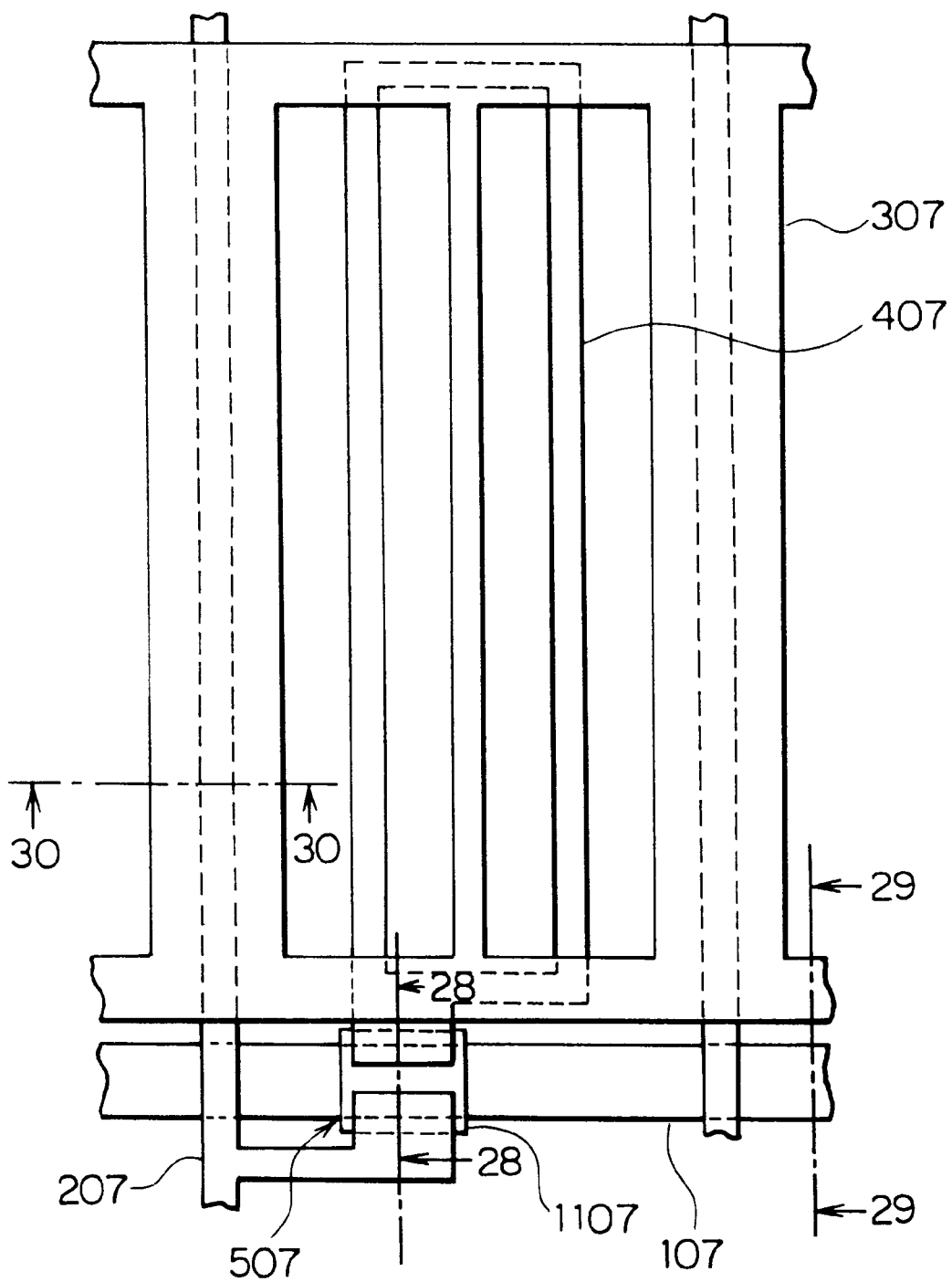
FIG. 32 shows a liquid crystal display device according to a seventh embodiment of this invention.
Figure 33:
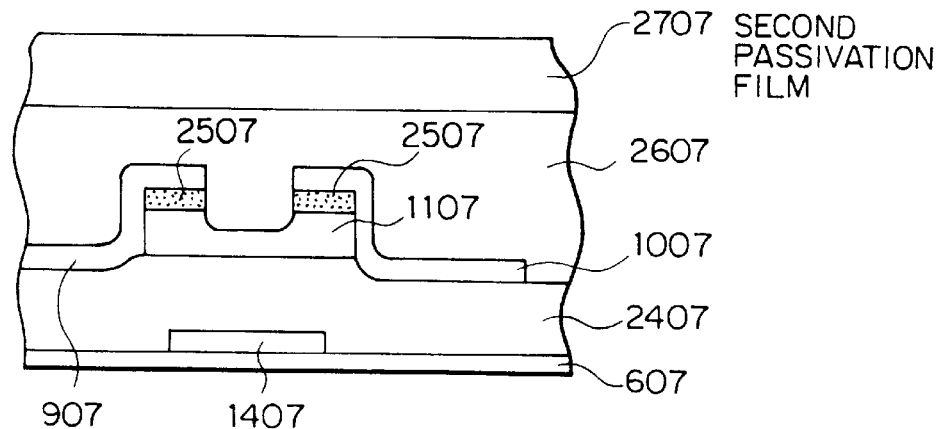
FIG. 33 shows a cross sectional view of a TFT in FIG. 32.
Figure 34:
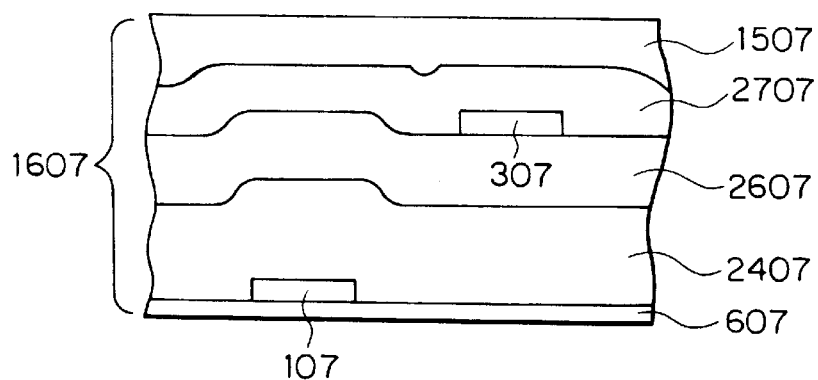
FIG. 34 is a cross sectional view showing a relation between a scanning signal line and a common electrode in FIG. 32.
Figure 35:
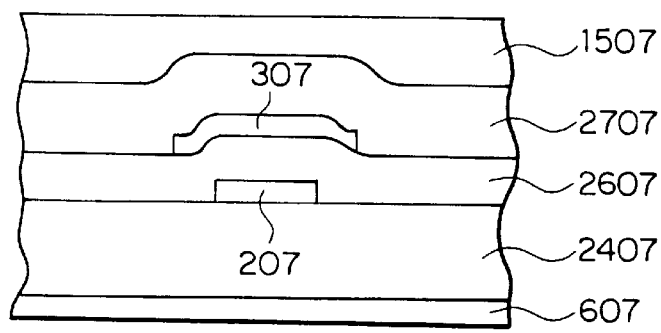
FIG. 35 is a cross sectional view showing a relation between a data line and a common electrode in FIG. 32.

In this embodiment, the scanning signal line 105 and the common electrode 305 are formed on different layers as shown in FIG. 26 different from the first embodiment. That is, the scanning signal line 105 is formed on the TFT side glass substrate 605 on which the gate electrode is formed, while the common electrode is formed on the passivation film 2605. On the other hand, the data line 205 and the pixel electrode 405 are formed on the gate insulating film 2405 on which the gate electrode and the source electrode 1005 are formed, as shown in FIG. 27. In addition, the liquid crystal display device comprises an orientation film 1505 covering the common electrode 305, as shown in FIGS. 26 and 27. In this case, the entirety of the TFT side glass substrate 605 to the orientation film 1505 is referred to as a TFT substrate 1605 like the first embodiment.

In this embodiment, a specific region of the common electrode 305 is formed over a specific region of the data line 205 to cover the whole of the specific region of the data line 205 as shown in FIGS. 24 and 27. The specific region of the common electrode 305 has a rectangular shape having the width $W_{COM}$ and the length $L_{COM}$, while the specific region of the date line 205 has a rectangular shape having the width $W_D$ and the length $L_{COM}$. Therefore, in this embodiment, the leak electric field can be substantially eliminated like in the first embodiment.

For reference, description will be made about the TFT substrate 1605 related to the fifth embodiment of this invention.

First, the scanning signal line 105 and the gate electrode 1405 are formed to about 1000 Å on a TFT side glass substrate 605 by sputtering Cr.

Next, the gate insulating film 2405 is formed to cover the scanning signal line 105 and the gate electrode 1405 by depositing SiN (insulator) to about 3000 Å on a TFT side glass substrate 605 through the CVD process.

Subsequently, the a-Si layer 1105 and the n⁺a-Si layer 2505 are deposited on the gate insulating film 2405 to 3000 Å and 500 Å through the CVD process, respectively.

Next, the drain electrode 905, the source electrode 1005, the pixel electrode 405 and the data line 205 are formed to about 1000 Å by sputtering Cr.

Next, the channel region is etched to form a groove shown in FIG. 25. In this case, the thickness of the a-Si layer 1105 is set larger as compared to the first embodiment because the a-Si layer 1105 is etched.

Subsequently, the SiN (insulator) is deposited to about 1500 Å through the CVD process to form the passivation film 2605. Next, the common electrode 305 is formed on the passivation film 2605 to about 1000 Å by sputtering Cr. Finally, an orientation film 1505 is formed to cover these elements.

(Sixth Embodiment)

Referring to FIGS. 28 to 31, a description will be made about a liquid crystal display device according to a sixth embodiment of this invention.

The liquid crystal display device according to the sixth embodiment is similar to the first embodiment except that the sixth embodiment has an arrangement of a passivation different from the first embodiment.

More specifically, the liquid crystal display device comprises a scanning line 106, a data line 206, a common electrode 306, a pixel electrode 406 and a TFT 506, like in the first embodiment. In this embodiment, a passivation film 2606 is formed between the scanning signal line 106, the common electrode 306 and the gate electrode 1406 and an orientation film 1506 different from the first embodiment. A polyimide family, which is obtained by polymerizing thermally (250° C. or more) and chemically a polyamic acid (polyimide acid), is generally used as the orientation film. If the polyimide orientation film directly contacts with the common electrode 306, the polyimide orientation film is deformed and charged up. Therefore, the passivation film 2606 is provided to prevent the common electrode 306 from directly contacting with the polyimide orientation film 1506 in this embodiment.

(Seventh Embodiment)

Referring to FIGS. 32 to 35, a description will be made about a liquid crystal display device according to a seventh embodiment of this invention.

The liquid crystal display device according to the seventh embodiment is similar to the fifth embodiment except that the seventh embodiment has an arrangement of a passivation film different from the fifth embodiment.

Specifically, the liquid crystal display device comprises a scanning line 107, a data line 207, a common electrode 307, a pixel electrode 407 and a TFT 507 like the fifth embodiment. In this embodiment, a second passivation film 2707 is formed between the common electrode 307 and an orientation film 1507 different from the fifth embodiment. The second passivation film 2707 is provided to prevent the common electrode 307 from directly contacting with the polyimide orientation film 1507.

Next, a description will be made about configuration of the common electrode.

Figure 36:
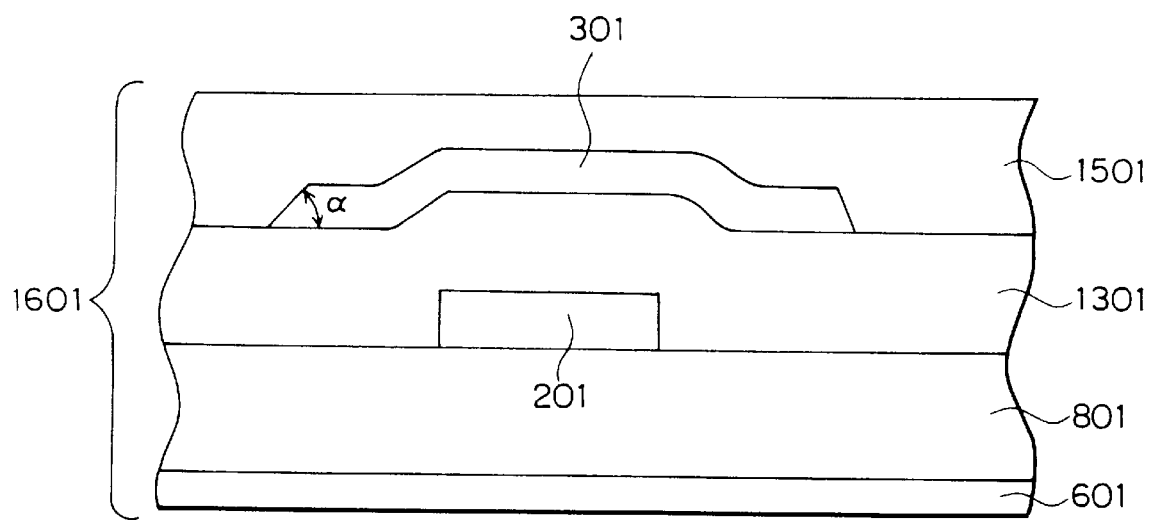
FIG. 36 is a cross sectional view showing a taper angle of a common electrode.

Referring to FIG. 36, the common electrode 301 has a tapered portion at a peripheral edge thereof. The tapered portion has an angle α, as illustrated in FIG. 36. Where the common electrode 301 has the taper angle α which falls within a range between 20° and 85°, occurrence of irregularities can be avoided during a rubbing process of the orientation film, as compared to such a case that the common electrode 301 has no tapered portion. This shows that the irregularities on the surface of the orientation film can be prevented in the illustrated example.

Next, a resistivity of the common electrode will be considered hereinunder.

A parastic capacitance between the common electrode 301 and the data line 201 becomes a problem, since the common electrode 301 is arranged over the data line 201 in the embodiments, as described above. Therefore, it is desirable that the common electrode 301 is constituted of a metal having a low resistivity between $1\times10^{-8}$ Ωm and $50\times10^{-8}$ Ωm to reduce the parastic capacitance. To this end, Cu, Al, Cr, W, Ta, Nb and an alloy thereof are used as the metal having the above low resistivity.

Next, the thickness of the insulating film 1301 between the common electrode 301 and the data line 201 will be investigated. In this case, a dielectric constant generally depends on a material of the insulating film 1301. On the other hand, the dielectric constant relates to the parastic capacitance. In this case, the film thickness is converted to a thickness of SiN. The converted film thickness is represented by d' and is given by using a dielectric constant $\epsilon_n$ of the SiN, a dielectric constant $\epsilon_i$ of the insulating film and the film thickness d of the insulating film. Namely, the film thickness d' is represented by the following equation.

$$d' = d \times \epsilon_n / \epsilon_i$$

It is suitable that the converted film thickness ranges from 1000 Å to 10000 Å in the embodiments.

In addition, experiments are carried out for the first and second embodiments to ascertain an effect of this invention. The result will be described with drawings.

Figure 37:
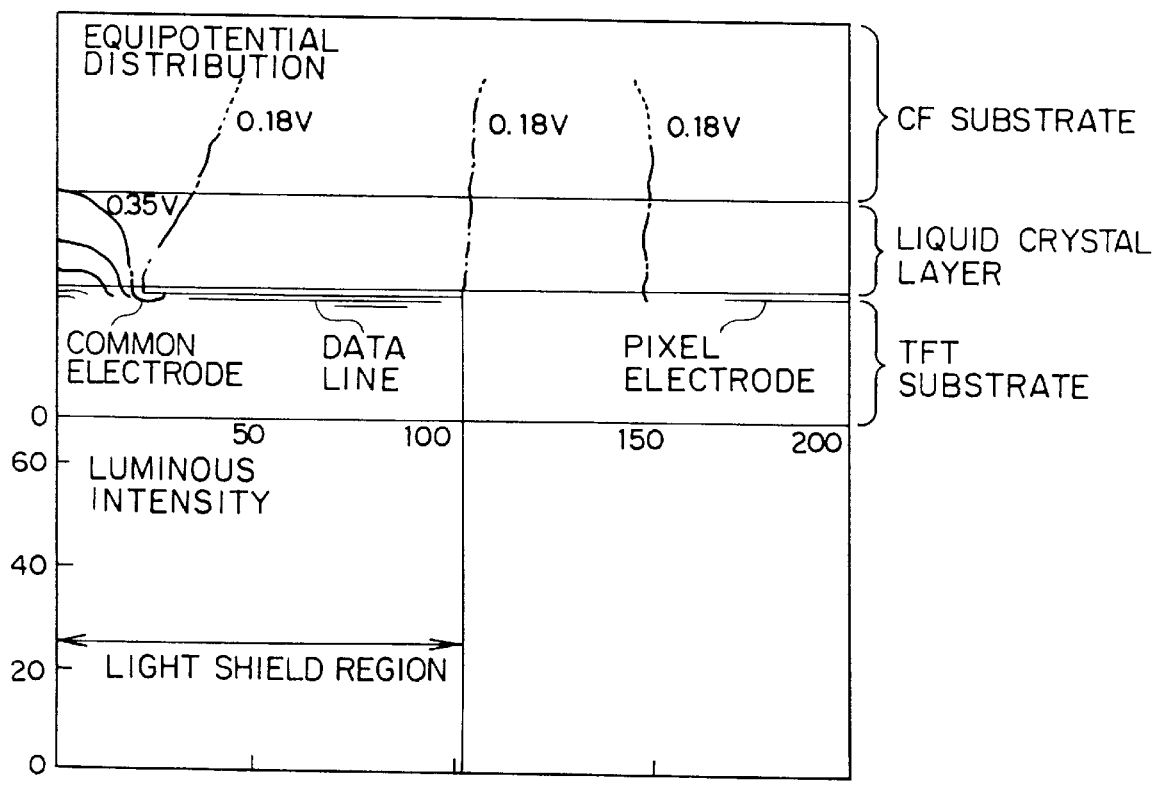
FIG. 37 shows an experiment result of a first embodiment.

An equipotential distribution shown in FIG. 37 is obtained as a result of the experiment for the first embodiment. The leak electric field for the liquid layer is not seen as shown in FIG. 37 because the common electrode is formed over the data line. Consequently, the BM layer for the common electrode and the pixel electrode is unnecessary. Thereby, an aperture ratio is increased from 50% (conventional) to 65% in a VGA panel.

Figure 38:
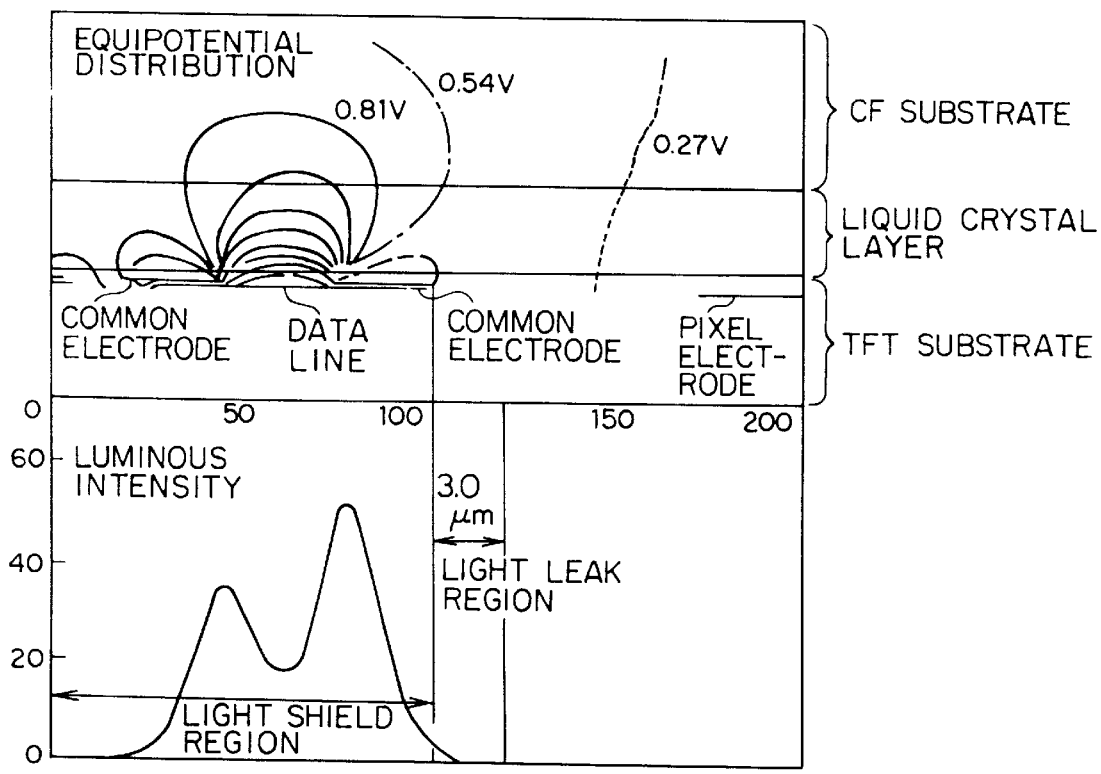
FIG. 38 shows an experiment result of a second embodiment.

On the other hand, an equipotential distribution shown in FIG. 38 is obtained as a result of the experiment for the second embodiment. In the second embodiment, the width of the common electrode 302 is wider than that of the data line 202, and the common electrode 302 is closer to the liquid crystal layer than the date line 202. Therefore, a light leak region is half or less as compared to the conventional case shown in FIG. 5. As a result, the aperture ratio is increased as compared to the conventional case.

Figure 39:
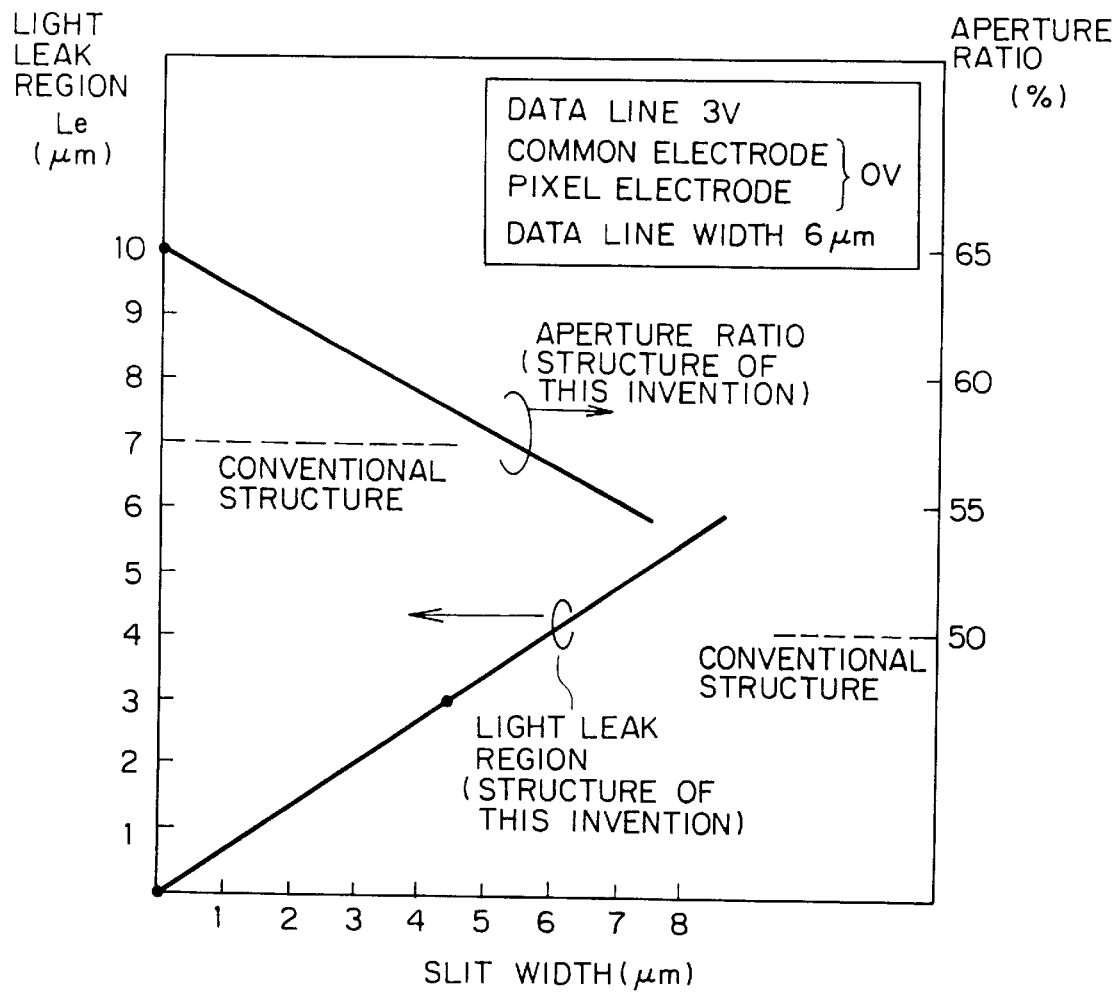
FIG. 39 shows a relation between a slit width and a light leak region and an aperture ratio.

For reference, FIG. 39 shows a relation between a slit width Ws and the light leak region and a relation between the slit width Ws and the aperture ratio in such a condition that the slit width Ws is changed. In this case, a potential of the data line is set to 3V, a potential of each of the pixel electrode and the common electrode is set to 0V and the width of the date line is set to 6 μm.

As shown in FIG. 39, the aperture ratio is increased as the slit width Ws becomes narrow. On the other hand, the parastic capacitance between the data line and the common electrode becomes large. A desired slit width Ws is determined by taking the above fact into consideration.

While this invention has thus far been described in conjunction with several embodiments thereof, it will be readily possible for those skilled in the art to put this invention into practice in various other manners. For example, this invention is also applicable to a liquid crystal display device of a TN node type, although the description has been described to the liquid crystal display device of the IPS mode type.

What is claimed is:

1. A liquid crystal display device having a liquid crystal layer, comprising:

a pixel electrode;

a data line for supplying a data signal to said pixel electrode, said data line developing an electric field towards said liquid crystal layer; and shield means located between said data line and said liquid crystal layer for shielding said electric field, wherein said shield means comprises a common electrode for supplying a reference potential.

2. A device claimed in claim 1, wherein:

both said pixel electrode and said common electrode are arranged under said liquid crystal layer.

3. A liquid crystal display device having a liquid crystal layer, comprising:

a pixel electrode underlying said liquid crystal layer;

a data line for supplying a data signal to said pixel electrode; and a common electrode formed under said liquid crystal layer to supply a reference potential, said common electrode covering said data line;

said common electrode being provided closer to said liquid crystal layer than to said data line.

4. A device as claimed in claim 3, wherein:

said common electrode has a slit portion formed over said data line.

5. A device as claimed in claim 3, further comprising:

a passivation film formed on said common electrode; and an orientation film formed on said passivation film.

6. A liquid crystal display device comprising:

a substrate;

a first film formed on said substrate;

an data line formed on said first film, said data line being supplied with a data signal;

a second film formed on said data line;

a common electrode that is formed on said second film so as to cover said data line and that is given a reference potential, a liquid crystal layer formed over said common electrode.

7. A device as claimed in claim 6, wherein:

each of said first and second films comprises an interlayer film.

8. A device as claimed in claim 6, wherein:

said first film comprises a gate insulating film, and said second film comprises a passivation film.

9. A liquid crystal display device comprising:

a substrate;

an data line which is formed on said substrate and which is given a data signal;

a first film formed on said data line;

a second film formed on said first film a common electrode which is formed on said second film so as to cover said data line and which is given a reference potential; and a liquid crystal layer formed over said common electrode.

10. A device as claimed in claim 9, wherein:

each of said first and second films comprises an interlayer film.

11. A liquid crystal display device having a liquid crystal layer disposed over a substrate, comprising:

a pixel electrode formed over said substrate and under said liquid crystal layer;

a thin-film transistor comprising a source electrode, a drain electrode and a gate electrode, said source electrode being connected to said pixel electrode;

a scanning signal line for supplying a scanning signal to said gate electrode;

a data line for supplying a data signal to said drain electrode; and a common electrode formed under said liquid crystal layer to supply a reference potential, said common electrode covering said data line;

said common electrode being closer to said liquid crystal layer than said data line.

12. A device as claimed in claim 11, further comprising:

a first film on which said source electrode, said drain electrode and said data line are formed, and a second film on which said gate electrode, said scanning signal line, and said common electrode are formed.

13. A device as claimed in claim 11 wherein:

said common electrode has a width wider than that of said data line.

14. A device as claimed in claim 11, further comprising:

a first film on which said source electrode, said drain electrode, and said data line are formed, and a second film on which said gate electrode and said common electrode are formed;

said scanning signal line being formed on said substrate.

15. A device as claimed in claim 14, wherein:

said scanning signal line functions as a light shielding film, and said gate electrode is connected to said scanning signal line via a contact wiring pattern.

16. A device as claimed in claim 11, wherein:

said common electrode covers said data line in order to shield an electric field generated from said data line.

* * * * *

UNITED STATES PATENT AND TRADEMARK OFFICE
CERTIFICATE OF CORRECTION

PATENT NO. : 6,069,678
DATED : May 30, 2000
INVENTOR(S) : Michiaki Sakamoto, et al.

It is certified that error appears in the above-identified patent and that said Letters Patent is hereby corrected as shown below:

On the title page:

Delete priority data "286381" and insert --8-286381--.

Signed and Sealed this

Twenty-second Day of May, 2001

Attest:

NICHOLAS P. GODICI

*Attesting Officer*    Acting Director of the United States Patent and Trademark Office